(12) United States Patent
Bradshaw et al.

(10) Patent No.: US 11,100,007 B2
(45) Date of Patent: Aug. 24, 2021

(54) MEMORY MANAGEMENT UNIT (MMU) FOR ACCESSING BORROWED MEMORY

(71) Applicant: Micron Technology, Inc., Boise, ID (US)

(72) Inventors: Samuel E. Bradshaw, Sacramento, CA (US); Ameen D. Akel, Rancho Cordova, CA (US); Kenneth Marion Curewitz, Cameron Park, CA (US); Sean Stephen Eilert, Penryn, CA (US); Dmitri Yudanov, Rancho Cordova, CA (US)

(73) Assignee: Micron Technology, Inc., Boise, ID (US)

( * ) Notice: Subject to any disclaimer, the term of this patent is extended or adjusted under 35 U.S.C. 154(b) by 136 days.

(21) Appl. No.: 16/424,420

(22) Filed: May 28, 2019

(65) Prior Publication Data

US 2020/0379919 A1    Dec. 3, 2020

(51) Int. Cl.
  *G06F 12/1027* (2016.01)
  *H04L 29/08* (2006.01)
  *H04W 84/04* (2009.01)

(52) U.S. Cl.
  CPC ...... *G06F 12/1027* (2013.01); *H04L 67/1097* (2013.01); *G06F 2212/657* (2013.01); *G06F 2212/68* (2013.01); *H04W 84/042* (2013.01)

(58) Field of Classification Search
  None
  See application file for complete search history.

(56) References Cited

U.S. PATENT DOCUMENTS

| | | |
|---|---|---|
| 9,996,370 B1 | 6/2018 | Khafizov et al. |
| 2002/0169938 A1 | 11/2002 | Scott et al. |
| 2009/0164737 A1 | 6/2009 | Deshpande et al. |
| 2010/0312850 A1 | 12/2010 | Deshpande |
| 2011/0010521 A1 | 1/2011 | Wang et al. |
| 2011/0072234 A1 | 3/2011 | Chinya et al. |

(Continued)

FOREIGN PATENT DOCUMENTS

| | | |
|---|---|---|
| KR | 20140092493 A | 7/2014 |
| KR | 20160071685 A | 6/2016 |

OTHER PUBLICATIONS

International Search Report and Wirtten Opinion, PCT/US2020/029295, dated Jul. 30, 2020.

(Continued)

*Primary Examiner* — Jane Wei
(74) *Attorney, Agent, or Firm* — Greenberg Traurig

(57) ABSTRACT

Systems, methods and apparatuses to accelerate accessing of borrowed memory over network connection are described. For example, a memory management unit (MMU) of a computing device can be configured to be connected both to the random access memory over a memory bus and to a computer network via a communication device. The computing device can borrow an amount of memory from a remote device over a network connection using the communication device; and applications running in the computing device can use virtual memory addresses mapped to the borrowed memory. When a virtual address mapped to the borrowed memory is used, the MMU translates the virtual address into a physical address and instruct the communication device to access the borrowed memory.

19 Claims, 17 Drawing Sheets

(56) References Cited

U.S. PATENT DOCUMENTS

| | | |
|---|---|---|
| 2011/0252166 A1 | 10/2011 | Padala et al. |
| 2014/0164621 A1 | 6/2014 | Nakama |
| 2014/0208042 A1 | 7/2014 | Chinya et al. |
| 2014/0280669 A1 | 9/2014 | Harper, III et al. |
| 2015/0012593 A1 | 1/2015 | Phillips et al. |
| 2015/0046661 A1 | 2/2015 | Gathala et al. |
| 2015/0095489 A1 | 4/2015 | Makida et al. |
| 2015/0324685 A1 | 11/2015 | Bohn et al. |
| 2016/0077946 A1* | 3/2016 | Raikin .................. G06F 13/385 710/14 |
| 2016/0179391 A1 | 6/2016 | Zhang et al. |
| 2016/0188452 A1 | 6/2016 | Almasi et al. |
| 2016/0314079 A1* | 10/2016 | Medovich ........... G06F 12/1072 |
| 2017/0052723 A1* | 2/2017 | Voigt .................... G06F 3/0679 |
| 2017/0083340 A1* | 3/2017 | Burger .................. G06F 9/3004 |
| 2017/0289251 A1 | 10/2017 | Kurihara et al. |
| 2017/0324813 A1 | 11/2017 | Jain et al. |
| 2018/0322392 A1 | 11/2018 | Liu et al. |
| 2018/0349313 A1 | 12/2018 | Ahn et al. |
| 2019/0294340 A1 | 9/2019 | Stabrawa et al. |
| 2019/0354506 A1* | 11/2019 | Bruner .............. G06F 15/17331 |
| 2020/0042338 A1 | 2/2020 | Poothia et al. |
| 2020/0183840 A1 | 6/2020 | Johns et al. |
| 2020/0379808 A1 | 12/2020 | Eilert et al. |
| 2020/0379809 A1 | 12/2020 | Yudanov et al. |
| 2020/0379914 A1 | 12/2020 | Yudanov et al. |
| 2020/0382590 A1 | 12/2020 | Yudanov et al. |

OTHER PUBLICATIONS

International Search Report and Written Opinion, PCT/US2020/029298, dated Aug. 6, 2020.
International Search Report and Written Opinion, PCT/US2020/029294, dated Aug. 12, 2020.
International Search Report and Written Opinion, PCT/US2020/029755, dated Aug. 12, 2020.
Vishakh Hegde et al., "Parallel and Distributed Deep Learning", May 31, 2016, pp. 1-8 [retrieved on Jul. 22, 2020.]. Retrieved from <https://web.stanford.edu/rezab/classes/cme323/S16/projects_reports/hedge_usmani.pdf> pp. 1-7.
Youngeun Kwon et al., "Beyond the Memory Wall: A Case for Memory-centric HPC System for Deep Learning", Feb. 18, 2019, pp. 1-15 [retrieved on Jul. 22, 2020.]. Retrieved from <https://arxiv.org/abs/1902.06468> pp. 1-13.
Page cache, Wikipedia, printed on Apr. 18, 2018.
Page replacement algorithm, Wikipedia, printed on Jul. 31, 2018.
Page table, Wikipedia, printed on Jul. 31, 2018.
Paging, Wikipedia, printed on Apr. 18, 2018.
Remote direct memory access, Wikipedia, printed on Jan. 30, 2019.
Translation lookaside buffer, Wikipedia, printed on Apr. 18, 2018.

* cited by examiner

MEMORY MANAGEMENT UNIT (MMU) FOR ACCESSING BORROWED MEMORY

FIELD OF THE TECHNOLOGY

At least some embodiments disclosed herein relate to memory services provided by operating systems.

BACKGROUND

In some computer systems, an operating system allows an application program to use virtual addresses of memory to store data in, or retrieve data from, memory components of one or more memory sub-systems of the computer system. The operating system defines the mapping between the virtual memory addresses and the physical memory addresses of one or more memory sub-systems connected to the Central Processing Unit (CPU) and/or a Graphics Processing Unit (GPU) and/or System-On-a-Chip (SoC) of the computer system. Such mapping can be defined through the use of page tables. A page table entry specifies the mapping between a set of virtual memory addresses of a virtual memory page and a corresponding set of physical memory addresses of a physical memory page. The page tables can be used to implement the memory accesses requested for virtual memory addresses by translation of the virtual memory addresses into corresponding physical memory addresses of the memory sub-systems.

A computer processor can have a memory management unit (MMU) configured to perform the translation of virtual memory addresses into physical memory addresses according to page tables defined by the operating system. The memory management unit (MMU) can have a translation lookaside buffer (TLB) that is configured to cache the recently used page table entries. The memory management unit (MMU) may perform other memory related tasks, such as cache control and/or memory protection.

In general, a virtual address space for memory in a computer can be divided into pages of a predetermined size. A page of virtual memory is represented by the collection of the virtual memory addresses; the virtual memory addresses can be mapped to the physical memory addresses of a page of physical memory in the memory sub-systems; page table entries define the address mapping between the page of virtual memory and the page of physical memory.

In some computer systems, an operating system can use a paging technique to access a page of data in a storage or memory device via a page of memory in a memory module. At different time instances, the same page of memory in a memory module can be used as proxy to access different pages of memory in the storage or memory device or another storage or memory device in the computer system.

Remote direct memory access (RDMA) is a technique that allows direct memory access from one computer into another, without involving any of the operating systems of the computers involved (e.g., after the operating systems are executed to negotiate and set up the memory resources for RDMA operations). Prior to an RDMA operation (e.g., read or write), commands are executed to establish a memory mapping between the two computers via one or more networking devices. When an application running on a computer performs an RDMA operation, the application data is delivered directly across the computer network, reducing latency and enabling fast data transfer. RDMA uses a network adapter to transfer data to or from application memory, eliminating the need to copy data between application memory and the data buffers in the operating system.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
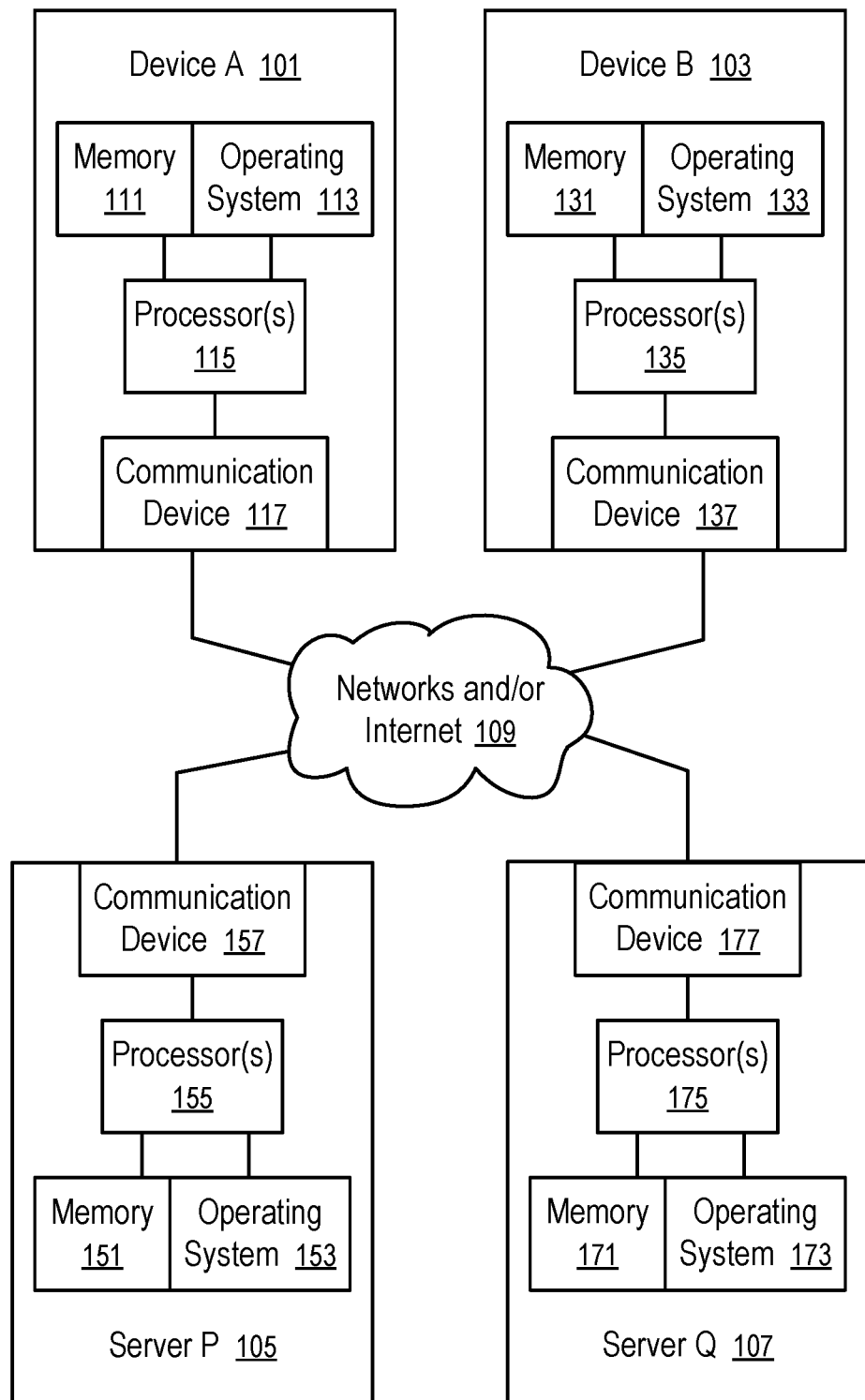
FIG. 1 shows a system in which a computing device or a server computer can borrow memory from and/or lend memory to another computing device and/or another server computer.

At least some embodiments disclosed herein provide techniques of inter operating system memory services over communication network connections, such that a borrower device can expand its memory capacity by using a communication link and the memory of a lender device. Operating systems of the borrower device and/or the lender device can be configured to seamlessly bridge the gap over the communication link, such that application programs running on the borrower device can use its local memory and the borrowed memory without distinction. The local memory is physically installed in the borrower device; and the borrowed memory is physically installed in a lender device that is connected to the borrower device via a communication connection.

Optionally, a portion of the borrowed memory and/or the local memory in the borrower device can be loaned to another device over a computer network. A borrower device can have multiple lender devices. Thus, a borrower-lender device hierarchy can be formed on a hierarchy of communication links among the devices.

The operating system of the borrower device can use a virtual to physical memory map to bridge the differences in the local memory and the borrowed memory. For example, the operating system of the borrower device can manipulate Page Table Entry (PTE), in response to a miss in the Translation Lookaside Buffer (TLB) of the borrower device that can lead to a determination of a page fault, to use a portion of the local memory of the borrower device as aperture, proxy, and/or cache in accessing the borrowed memory over a communication link. Cache coherency between the lender device and borrower device can be relaxed for improved bandwidth usage. Since the differences between the local memory and the borrowed memory area are shielded by the operating system of the borrower device from applications running on the borrower device, an application running on the borrower device can byte-access the borrowed memory in a same way as accessing the local random access memory configured in the borrower device.

The memory services of the operating systems can be used to construct a multi-level byte-addressable memory in a computer system under a unified address space shared by multiple operating systems over non-coherent communication links. For example, a wearable computing device can borrow memory from a mobile computing device over a personal area network or a local area network. The wearable computing device can be a smart watch, a motion tracking device, or a smart glass, and the mobile computing device can be a smart phone, a touch pad computer, or a notebook computer, etc. The wearable computing device and/or the mobile computing device can borrow memory from a computing appliance over a local area network. For example, the computing appliance can be a mini-server, a desktop computer, a memory appliance, or a storage appliance, etc. The mobile computing device and/or the computing appliance can borrow memory from a server computer or a server farm over the Internet and/or via cloud computing.

In a multi-level hierarchy of lender-borrower of memory resources, each subsequent higher level device (e.g., a mobile computing device, a computing appliance, a server computer or farm) can use their memory capacity to boost on demand the memory capacity of lower level devices (e.g., a wearable computing device, a mobile computing device, a computing appliance), and/or devices in the same level. IoT devices will constitute environment, such as construction materials (concreate walls, roads and so on). It could be that low dense, but highly bulky cheap memory technologies will allow to integrate low-density memory (and compute) in construction at very low cost. Thus, we'll have sort of 'memory matter' (or may be compute matter) as a part of the environment that any device can use.

Optionally, some levels in the hierarchy can be skipped, depending on the availability of certain devices and/or network connections. For example, a wearable computing device can borrow memory from a computing appliance without going through a mobile computing device; and a mobile computing device can borrow memory from a server computer or a server farm over the Internet without going through a computing appliance in a local area network.

At the appliance and cloud levels, memory resources can be provisioned as a utility with Memory as a Service (MaaS). Such an arrangement can provide low level computing devices, such as wearable computing devices, mobile computing devices, and/or computing devices of internet of things, with enormous persistent memory capacity and storage resource on demand. Applications running on the low level computing devices can use the memory services provided by the operating systems to use the borrowed memory in a transparent way, as if the borrowed memory were part of the local memory of the borrower devices. As a result, no special programming is required in the applications to use the borrowed memory.

The applications running on the borrower devices can use the borrowed memory to store data persistently and thus eliminate or reduce the need for operations to store data via a file system. For example, a lender appliance/server can provide a persistent random access memory, or a storage capacity, to offer memory resources to borrower devices and manage the persistence and/or redundancy of the data stored in the offered memory resources such that the borrowed memory can be treated as virtual non-volatile random access memory in the borrower devices.

Optionally, memory provided as a service can include semantics for memory page sharing among clients/borrowers, locking mechanisms, time out mechanisms, etc.

As an example, a phone can obtain, as a borrower device, 8 terabyte (TB) of observable memory over a wireless local area network (WLAN) (e.g., facilitated via a home Wi-Fi access point) from a memory appliance functioning as a lender device. The 8 TB of memory is observable to applications running under the operating system of the phone, in a way same as applications running on a phone having 8 TB of local memory. Alternatively, the phone can obtain 8 TB of observable memory over a cellular communications network from a server or the cloud computing infrastructure that is configured as a lender device. Optionally, the phone can borrow part of the 8 TB of observable memory from the memory appliance and part of the 8 TB of observable memory from the server or the cloud computing infrastructure. The 8 TB of observable memory can be virtually made available on the phone by the operating system of the phone such that applications running on the phone can use the virtual/remote memory, even though the phone may have only 8 megabyte (MB) of physical local memory. The 8 TB of borrowed memory expends the memory capability of the phone to over 8 TB; and to applications running on the phone with borrowed memory, the memory capacity of the phone appears to be the same as a phone having more than 8 TB of local random access memory.

Since the borrower devices typically do not use borrowed memory at once at the time of borrowing the memory, the lender devices do not have to block-allocate the memory loaned to the borrowed device upon the borrowing of the memory. The lender devices can implement thin provision of memory (e.g., thinly provision memory) and incrementally allocate the memory in response to the borrower device using an increasing amount of the borrowed memory.

The applications running under the operating system of a borrower device can read and write on demand memory pages that are borrowed from the lender device(s). Physical page allocation in a lender device and/or a corresponding allocation in a borrower device can be configured to be performed in response to a write operation on the page. A part of local memory of the borrower device can be configured as cache, proxy, and/or aperture in accessing a borrowed page. When an application running on the borrower device accesses a virtual page, the operating system of the borrower device can migrate the content of the accessed virtual page to the local memory. When a local memory page has not been accessed for a certain period of time and/or is to be used for hosting the content of another page, the operating system of the borrower device can evict or migrate the content of the virtual page in the local memory to the borrowed memory on the lender device. Optionally, the operating system of the borrower device can use a portion of the local random access memory of the borrower device as a fast buffer for critical data, and use the borrowed memory physically residing in the remote lender device to hold less critical data. Less critical data and/or less frequently used data can be migrated to the local random access memory of the borrower device when needed.

In general, a lender device for a lower level device in the hierarchy can be itself a borrower device in a higher level in the borrower-lender device hierarchy. For example, a phone, as a borrower device, may borrow 8 TB of memory from a memory appliance as a lender device. The memory appliance, as a borrower device, may borrow 4 TB of memory from a server and combine the 4 TB of memory borrowed from the server and 4 TB of its local memory into the 8 TB of memory loaned to the phone. In some implementations, the 4 TB of memory borrowed from the server can be identified to the phone such that when the connection between the phone and the appliance is not available, the phone can use an alternative connection to the server to continue using the 4 TB memory without going through the memory appliance. However, the alternative connection may be slower than the one to the memory appliance, since the appliance could be in closer proximity to the phone than the remote server.

The operating system of a lender device and the operating system of a borrower device can communicate with each other to facilitate seamless memory access across the communication link between the lender device and the borrower device. Thus, it is not necessary to pre-allocate physical memory in the lender device before applications running on the borrower device start using memory. The page eviction traffic and lender device memory availability determine the size of the usage of borrowed memory as the footprint of the applications running on the borrower device grows. Elimination of the requirements for pre-allocation of the physical memory in the lender device for an application (e.g., as required in case of RDMA protocols) removes a necessity for special programming (e.g., Message Passing Interface (MPI) over RDMA) and allows an application program to function in devices of varying configurations in their original code yet utilizing all benefits of scale-out application capacity as they would in the case of RDMA and alike.

In general, a lender device can be configured to operate in a passive mode or an active mode for a particular borrower device. The lender device can operate in different modes for different borrower devices.

In the passive mode, the operating system of the lender device observes memory pages that are cached or migrated by the operating system of the borrower device over the link and modifies its own page table entries, which correspond to these pages, accordingly. Observation that the lender operating system performs on page movement can be done for example by the bus snooping or hardware monitoring.

The operating system of a borrower device is configured to maintain page tables for local memory of the borrower device and the borrowed memory that physically resides in the lender device. In general, when a page of borrowed memory is being accessed by an application running on the borrower device, the content of the page may or may not be currently stored in a page of local memory of the borrower device.

When the borrower device accesses a page that does not exist in the local memory of the borrower deice a page fault happens. For our purpose we consider a page fault happening in two cases: 1) an accessed page does not exist at all; and 2) the accessed page exists but not in local memory.

If the page does not exist, it was never written or read. There is no page table entry (PTE) for that page. It is first time the page is being accessed. If a read operation is performed on such a page, it is not necessary to allocate actual page. Some operating systems (e.g., Linux) can provide a fake page filled with zeros, because the page has never written and thus contains no data. Hence, a read operation performed on such a page gets zero as a result. In this case the OS executes handler for this page fault: TLB miss causes page walk, which determines that a read operation is performed on a page without PTE. As a result, a mapping to zero page is returned.

If a write operation is performed on a page for the first time, it is a true fault. The true fault results in a new PTE and page allocation in local memory. An example of page fault handler for this case: the TLB miss causes page walk, which determines that a write operation is performed on a page without PTE. As a result, the operating system allocates new page, generates the PTE and installs the PTE in the page table. After the PTE is cached in TLB, the fault is resolved.

When a page fault occurs in accessing the borrowed page and the content of the page is not currently in the local memory of the borrower device (e.g., after the content of the borrowed page has been migrated/evicted to the lender device), the operating system of the borrower device can communicate with the lender device over the communication link between the borrower device and the lender device to retrieve or migrate the content of the borrowed page.

Caching operations can be performed in connection with the processing in the above discussed two cases. For example, the lender device can keep a page copy. The copy can be useful if the borrower device does not further modify the page (e.g., performs only read operations on the page). In such a situation, no eviction is needed because true copy of the page already exists on the lender device. Similarly, the borrower device can perform speculative eviction of a page, when the communication link between the borrower device and the lender device is free to use.

Optionally, the lender device and/or the borrower device can be configured with firmware/hardware that accelerates the operations of migrating the content between the lender device and the borrower device.

Optionally, the operating system of the lender device can be configured to maintain and operate its own set of page tables and associated resources, such as page table walker, Translation Lookaside Buffer (TLB), Content-addressable memory (CAM), lookup tables etc.

The operating system of the lender device monitors memory access requests from any of the borrower devices that borrow memory from the lender device. It can be configured to provide semantics for page sharing among the borrower devices (e.g. atomics, locks, semaphores, flags, timeouts, etc.). As a result, the address space of borrowed memory is unified among the borrower devices according to the page tables in the lender device. Distributed applications can take advantage of the unified address space by sharing borrowed memory, via the lender device, with different instances applications running on different borrower devices.

Optionally, the lender device can be configured to accept requests from borrower devices to produce computation results on certain regions of memory loaned to the borrower devices. Thus, the lender device provides not only the memory resource but also the computing power for processing data in the memory loaned to the borrower devices.

The memory services offered by the operating systems of borrower devices and lender devices allow an application running on a borrower device to address borrowed memory at byte granularity with fault resolved at page granularity.

The operating system of the borrower device can evict or migrate a page from local memory to the lender device over the communication link between the borrower device and the lender device. The operating system of the borrower device can identify a page for eviction or migration from the local random access memory of the borrower device to its borrowed memory based on the infrequent use of the page and/or based on the page being used less recently than other pages or based on criticality or any other possible measurable system parameter. The operating system of the borrower device can decide to evict or migrate a borrowed page to free local memory for other uses, such as new local page allocations or for migration of a page from the lender device. As a result of this method the current page owner (borrower or lender) owns true copy of the page. Other devices may still cache it just in case if page is still not modified after the owner releases it. For example, when borrower gets the page from the lender the lender does not have that page any more. However, the lender may not delete page copy but keep it: in case if page will be non-modified upon eviction there will be no need to transfer it over the link back to the lender. What if lender also wants to modify it or provide it to other borrowers? In this case all writes would have to happen on the lender so to merge these write request from different borrowers.

To evict or migrate a page, the operating system of the borrower device communicates the content of the page to the lender device, causing the lender device to store the page in the memory of the lender device. The operating system of the borrower device can then update a page table to indicate that the page is now in the lender device and not in the local memory of the borrower device.

In active mode, the operating system of the lender device can be configured to monitor page tables on the borrower device, identify unused pages, and repurpose the unused pages for other memory users.

The interactions between the lender device and the borrower device can be implemented via virtualization, which allows the lender device to monitor page table usages in the borrower device.

For example, the operating system of the borrower device can be partially virtualized for operations in the operating system of the lender device. Some of the memory management code/subroutines of the operating system of the borrower device can be configured via virtualization to run on the lender device and/or as part of the operating system of the lender device. In such an implementation, the operating system of the borrower device can extend memory access request to the operating system of the lender device to execute such subroutines, which may be hardware/firmware-accelerated at the level of the operating system of the lender device.

For example, the operating system of the lender device can create a virtual memory device and offer the virtual memory device to the borrower device. The borrower device can request the virtual memory device on demand and make available the virtual memory device for servicing the memory resource needs of applications running on the borrower device.

In some instances, if an application running on the borrower device can tolerate or accept the latency caused by the communication link between the borrower device and the lender device, access to the borrowed page can be made directly over the communication link without migrating the entire page to the lender. In other implementations, the content migration can be configured at a sub-page level; and only the portion of the page that is being accessed and/or predicted to be accessed is migrated. Optionally, the operating system may use a remote direct memory access (RDMA) technique in implementing the direct memory access. Optionally, such direct memory access can be implemented at the memory controller and/or memory management unit and thus avoid the standard RDMA protocol and its overhead.

In some implementations, the operating system of the borrower device is configured to dynamically adjust physical location of virtual memory pages. A page of virtual memory is specified by the virtual memory addresses of the page. The virtual memory page can be initially located in the local memory of the borrower device, subsequently moved to the memory loaned by a lender device to the borrower device, and subsequently moved to another local page of the borrower device.

To migrate a virtual page from the lender device to the borrower device, the borrower device fetches the content of the page from the lender device, stores the content in its local memory, and updates relevant page tables to establish the mapping between the local physical page and the virtual page. Once the virtual page is migrated to the borrower device, the lender device can free the physical memory that was previously used for the virtual page and/or erase the data stored there. Optionally, the operating system of the lender device can reserve the page previously used for the virtual page and keep its content as a backup copy of the virtual page.

In the reverse direction, the operating system of the borrower device can migrate the virtual page from the borrower device to the lender device. For example, the operating system of the borrower device can request the allocation of a borrowed page in the lender device, and transmit the content of the virtual page for storing it in the borrowed memory on the lender device. Once the content of the virtual page is stored on the lender device, the operating system of the borrower device can update its page tables for the virtual page to identify the mapping between the virtual page and its physical location in the borrowed memory to complete the migration of the page to the lender device. After the migration of the virtual page, the local memory previously used to host the virtual page can be used for hosting another virtual page. In such an implementation, it is not necessary to statically map a predetermined portion of the virtual memory or virtual memory address space to the borrowed memory in the lender device(s).

Furthermore, a virtual page does not have to be hosted in a predetermined lender device. For example, the operating system of the borrower device can migrate a virtual page from a first lender device to the borrower device, and then migrate the virtual page from the borrower device to a second lender device. In some instances, the operating system of the borrower device can request the migration of a virtual page from a first lender device to a second lender device without downloading the content of the page to the borrower device and then uploading this content to the second lender device.

Using the techniques of Memory as a Service (MaaS), mobile device vendors can market mobile devices having terabytes of memory capacities at the operating system level, which is to be backed by emerging memories on the lender devices including cloud computing infrastructure. For example, applications in a smart phone configured with 128 MB local memory can access 64 TB of random access memory when the phone is connected to a computer network or the internet or local memory appliance or any other device that implements concepts of MaaS described herein.

FIG. 1 shows a system in which a computing device or a server computer can borrow memory from and/or lend memory to another computing device and/or another server computer.

FIG. 1 illustrates computing devices (101 and 103) and server computers (105 and 107) as examples of borrower devices and lender devices connected via computer networks and/or the Internet (109), which can include a cellular communications network, such as a fifth generation cellular network.

Each of the computing devices (101 and 103) and server computers (105 and 107) can borrow memory from another device and/or lend memory to another device. Each of the computing devices (101 and 103) and server computers (105 and 107) can have one or more communicating devices (e.g., 117, 137, 157, and 177) to establish one or more communication links with each other or another computing devices or server computers in the system. Each of the computing devices (101 and 103) and server computers (105 and 107) can have one or more processor(s) (e.g., 115, 135, 155, and 175) configured to execute instructions, such as instructions of operating systems (e.g., 113, 133, 153, and 173) and applications or programs running under the operating systems.

Each of the computing devices (101 and 103) and server computers (105 and 107) can have local random access memory (e.g., 111, 131, 151, and 171) coupled (e.g., via memory buses) to respective processors (e.g., 115, 135, 155, and 175).

In some examples, the device A (101) or device B (103) can be a wearable computing device, a computing device of Internet of Things, a mobile computing device, etc.

In some examples, the server P (105) or server Q (107) can be a mini-server, a personal computer, a memory appliance, a storage appliance, a network storage device, a server computer, a server farm, etc.

In one example, the device A (101) can be connected to the device B (103), the server P (105), and/or the server Q (107) using a wired connection, a wireless personal area network (WPAN), a wireless local area network (WLAN), and/or a wireless wide area network (WWAN).

In another example, the device B (103) can be connected to the server P (105), and/or the server Q (107) using a wired connection, a wireless local area network (WLAN), and/or a wireless wide area network (WWAN).

In another example, the server P (105) can be connected to the server Q (107) using a wired connection, a local area network, a wireless local area network (WLAN), a wireless wide area network (WWAN), and/or the Internet.

The server P (105) can borrow memory from the server Q (107) and lend borrowed memory and/or local memory to the devices (101 and 103) (and/or similar devices). The device B (103) can borrow memory from the server P (105) and/or server Q (107) and lend borrowed memory and/or local memory to the device A (101) (and/or similar devices).

In general, a computing device can loan memory to one or more borrower devices and borrow memory from one or more lender devices.

The operating systems (113, 133, 157, and 173) are configured to provide memory services to applications and programs such that the applications and programs can use virtual memory without awareness of its physical allocation, such that this virtual memory may be partially allocated in borrowed memory and partially allocated in local memory (111, 131, 151, and 171). The operating systems and supporting hardware takes the burden from applications and programs to manage virtual memory allocations, which provides convenience for applications and programs not to have special code sections or designated instructions designed to handle the differences in local memory and borrowed memory allocations.

In one example, a portion of the local memory (171) of the server Q (107) is loaned to the server P (105). The server P (105) loans a portion of the borrowed memory and/or a portion of its local memory (151) to the device B (103), which in turn loans a portion of its borrowed memory and/or a portion of its local memory (131) to the device A (101). Thus, the virtual memory allocated by the operating system (113) to an application running on the processors (115) of device A (101) may partially reside in the local memory (111) of the device A (101), partially in the local memory (131) of the device B (103), partially in the local memory (151) of the server P (105), and/or partially in the local memory (171) of the server Q (107). The operating systems (113, 133, 157, and 173) are configured to cooperate with each other to provide the memory services and/or the physical allocation of the virtual memory used by the application among the local memories of various devices (e.g., 111, 131, 151, and/or 171) such that the application programmed to run on the device A and its local memory (101) can also run without modification with its virtual memory partly allocated in the borrowed memory (131, 151 and/or 171) loaned to the device A (101) by the device B (103), the server P (105) and/or the server Q (107).

Figure 2:
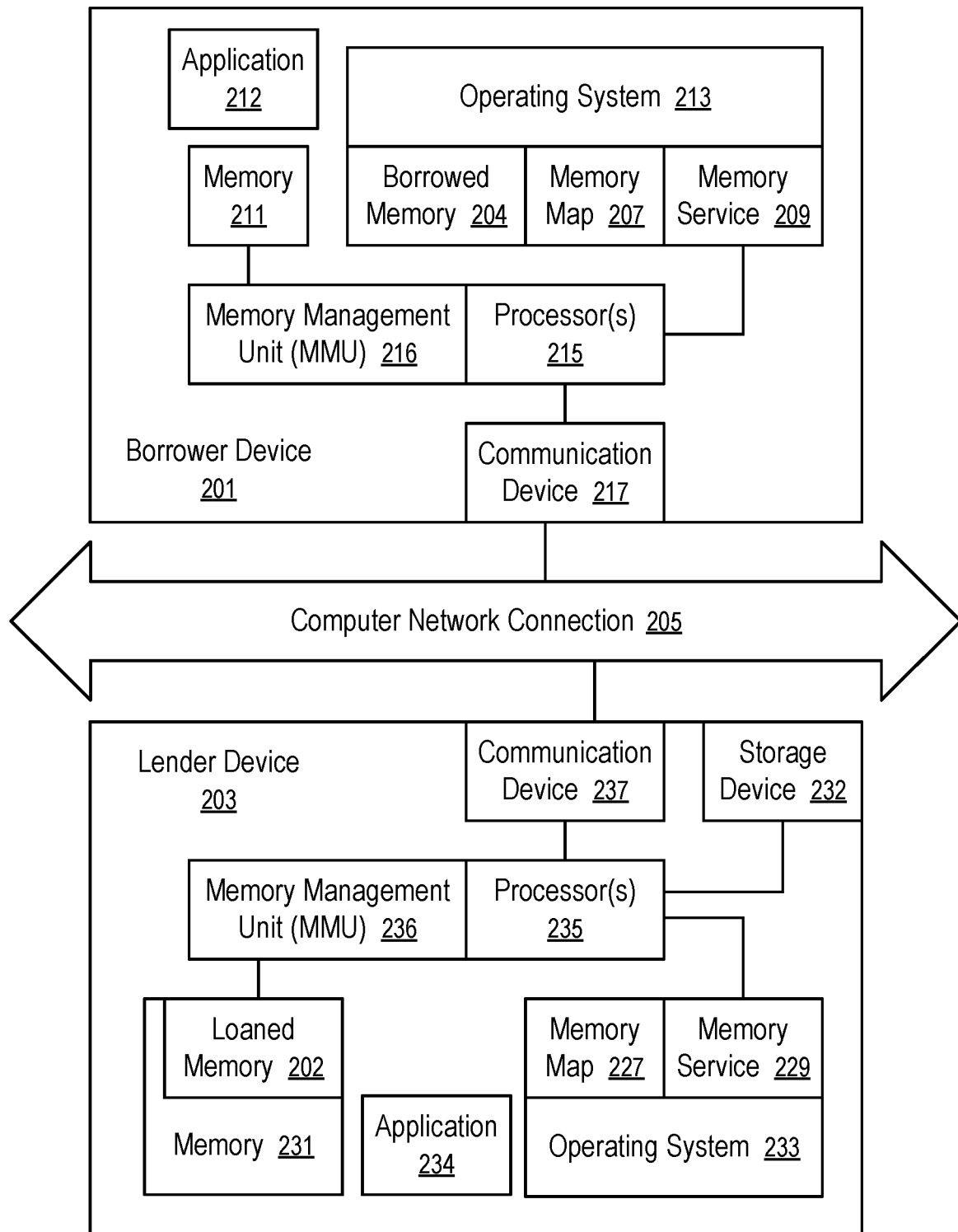
FIG. 2 illustrates a borrower device and a lender device implementing inter operating system memory services over communication network connections according to one embodiment.

FIG. 2 illustrates a borrower device (201) and a lender device (203) implementing inter operating system memory services over communication network connections, such as a wired or wireless connection (205) over a local area network, a wide area network, and/or a cellular communications network such as a fifth generation cellular network.

In FIG. 2, the borrower device (201) borrows memory from the lender device (203); and the lender device (203) loans the memory (202) to the borrower device (201). For example, the borrower device (201) can be the device A (101), the device B (103), or the server P (105) in the system of FIG. 1; and the lender device (203) can be the device B (103), or the server P (105) in the system of FIG. 1. Further, lender device functionalities can be implemented in the borrower device (201), enabling it to loan memory to another device. Similarly, borrower device functionalities can be implemented in the lender device (203), enabling it to borrow memory from another device.

In FIG. 2, the borrower device (201) has a communication device (217), one or more processors (215) with a memory management unit (MMU) (216), and local random access memory (211). The processor(s) (215) and the local memory (211) can be in separate computer chips and/or formed on separate integrated circuit dies in some embodiments, and can be packaged in a same computer chip and/or formed on a same integrated circuit die in other embodiments (e.g., in a System-On-a-Chip (SoC)).

The operating system (213) of the borrower device (201) includes a memory service module (209) configured to maintain a memory map (207). The memory map (207) identifies the mapping between virtual memory and physical memory, where the physical memory can be partially in the local memory (211) in the borrower device (201) and partially in the loaned memory (202) in the lender device (203). The operating system (213) services virtual memory to one or more applications (e.g., 212) running on the borrower device (201). The processor(s) (215) can run the application (212) by executing the instructions of the application code (212). The application memory read and write instructions can use the virtual memory. The memory management unit (MMU) (216) translates the virtual memory addresses into physical memory addresses according to the memory map (207).

When the borrower device (201) borrows memory from the lender device (203), the borrowed memory (204) is virtually in the borrower device (201) and physically it is in the lender device (203) as the loaned memory (202) in the local random access memory (231). Optionally, the lender device (203) can configure a portion of the loaned memory (202), or its entirety, in a storage device (232) that is coupled to the processor(s) (235) of the lender device (203) via a peripheral bus and/or a device controller. For example, the operating system (233) of the lender device (203) can allocate a portion of its memory resources as virtual memory to the operating system (213) of the borrower device (201) in a way similar to allocating memory resources as virtual memory to an application (e.g., 234) running on the lender device (203). Thus, the borrowed memory (204) used by the operating system (213) of the borrower device (201) can be in the unified virtual memory address space as the virtual memory used by the application (234) and/or borrowed memory used by other borrowers of the lender device (203). Alternatively, the operating system (233) of the lender device (203) can create virtual memory components for the borrowed memory (204); and operating system (213) of the borrower device (201) can make accessible the virtual memory component in the borrower device (201). A virtual memory controller for the virtual memory component can be implemented in the operating system (213) to access virtual memory components accessible to the borrower device (201). MMU 216 can implement hardware blocks to accelerate virtual memory controllers, and by doing so, improve speed of virtual memory component access.

In some examples the borrowed memory (204) is implicit, such that it is indistinguishable from the rest of virtual memory of applications running on borrower device 201. The distinction comes only when translating virtual page addresses to physical addresses by reading memory map 207, and upon that translation the physical addresses appear to be in the loaned memory 202. In other examples, the operating system (213) stores explicit identification for parts of virtual memory if it belongs to the borrowed memory (204) as provided by the lender device (203). In all cases the operating system 213 configures the memory map (207) to access the lender device (203) to read from and write to the virtual memory as being the borrowed memory (204) that is physically in the loaned memory (202) in the lender device (203) or in the borrower device (201) after migration to that device.

The memory map (207) can be implemented via page tables. A portion of the page tables are cached in the memory management unit (MMU) (216) such that when instructions executed in the processor(s) (215) access virtual addresses defined in the portion of page tables cached in the memory management unit (MMU) (216), the memory management unit (MMU) (216) translates the virtual addresses into physical addresses. The successful address translation allows the processor(s) (215) to proceed with memory accesses without the need to execute the code of operating system (213).

When the memory management unit (MMU) (216) cannot successfully translate a virtual memory address using the page tables cached in the memory management unit (MMU) (216), a page table entry cache miss is generated, which causes the processor (215) to execute the instructions of the memory service (209) of the operating system (213) to resolve this cache miss. In some implementations MMU contains a hardware IP architected to resolve page table entry cache miss in the cache of MMU (216). This IP, being a part of MMU, extracts required page table entries from page tables stored in the physical memory 211. If a required entry does not exist or it exists but it translates virtual page address to address in physical loaned memory 202 then a page fault is generated for this page. This fault can be resolved by the MMU 216 and communication deice 217 directly in hardware. Alternatively, this fault can be resolved by the operating system 213 and memory service 209 in software assisted by hardware blocks: MMU 216, processors 215, communication deice 217.

When the memory service (209) of the operating system (213) or MMU 216 determines that the virtual memory address being accessed is in the borrowed memory (204), the memory service (209) or MMU 216 can allocate a physical page of the local physical memory 211, communicate with the lender device (203) via communication devices 217 and 237 and computer network connection 205 to migrate the page of the borrowed memory (204) from the physical loaned memory 202 into the physical local memory 211, generate a page table entry mapping the virtual page to the allocated local physical page, and load the page table entry into the memory management unit (MMU) (216). Thus, before the page fault, the virtual page of the borrowed memory (204) is physically located in the loaned memory (202) in the lender device (203). After the processing of the page fault, the virtual page is located in the local memory (211). The content of the page in loaned memory 202 of the lender device 203 may still be saved for future use and other purposes.

When there is no free local page available for the migration, the memory service (209) can evict a selected virtual page that is currently in the local memory (211) to the loaned memory (202). When evicting the selected virtual page to the lender device (203), the memory service (209) communicates with the lender device (203) to transmit the content of the virtual page from the local memory (211) to the loaned memory (202) and updates the memory map (207). After evicting the virtual page from the local memory (211), the space in local memory (211) that was used for the evicted virtual page can be freed.

For example, the memory service (209) can be configured to evict the least frequently used virtual page or the least recently used virtual page.

In FIG. 2, the lender device (203) has a communication device (237), one or more processors (235) with a memory management unit (MMU) (236), and local random access memory (231). Optionally, the lender device (203) includes one or more storage devices (232) that are connected to the processor(s) (235) via a peripheral bus and/or a computer network. For example, the storage device (232) can be a solid state drive (SSD) or a hard drive (HD).

The operating system (233) of the lender device (203) includes a memory service module (229) configured to maintain a memory map (227). The memory map (227) identifies the mapping between virtual memory and physical memory. The memory map can be stored in the memory 231 or dedicated for it memory such as content-addressable memory or special cache. The operating system (233) services virtual memory to one or more applications (234) running on the lender device (203) in a way similar to the borrower device (201) servicing its application (212).

Optionally, the lender device (203) provisions loaned memory (202) to the borrower device (201) in a unified virtual memory space. The memory service (209) of the borrower device (201) uses the borrowed memory (204) in the same way as the application (234) using virtual memory provisioned by the memory service (229). For example, the memory service (229) of the lender device (203) can allocate virtual memory to the application (234) running on the lender device (203) and allocate virtual memory as the borrowed memory (204) used by the memory service (209) of the borrower device (201), as if the memory service (209) were an application running on the lender device. Thus, the application (234) running on the lender device (203) and the borrower device (201) (and other devices that borrow memory from the lender device (203)) can operate in a unified virtual address space. Cooperative computations can be configured based on the unified virtual address space. Further, when the lender device (203) borrows memory from another device/server (e.g., 105 or 107), the borrowed memory can also be provisioned in the unified virtual address space. The unified address space can facilitate data sharing and collaborative computation among the computing devices.

The memory service (229) of the lender device (203) can maintain a memory map (227), including the mapping between the virtual addresses of the loaned memory (202), which corresponds to the borrowed memory (204) accessed by the borrowed device (201), and the physical addresses of the loaned memory (202). For example, a page table entry of the virtual page identified by the borrower device (201) in accessing a borrowed page can be loaded into the memory management unit (MMU) (236) to facilitate the translation between the addresses of the virtual page and the physical address of the loaned memory (202) for the processor(s) of the lender device (203) to perform computations on behalf of the borrower device (201). Optionally, the lender device (203) can include a hardware similar to the memory management unit (236) to facilitate optimized and/or accelerated data transfer between the lender device (203) and the borrower device (201) using the memory map (227) that identifies the mapping between the borrowed memory (204) as known to the borrower device (201) and the loaned memory (202) physically accessible in the lender device (203).

Figure 3:
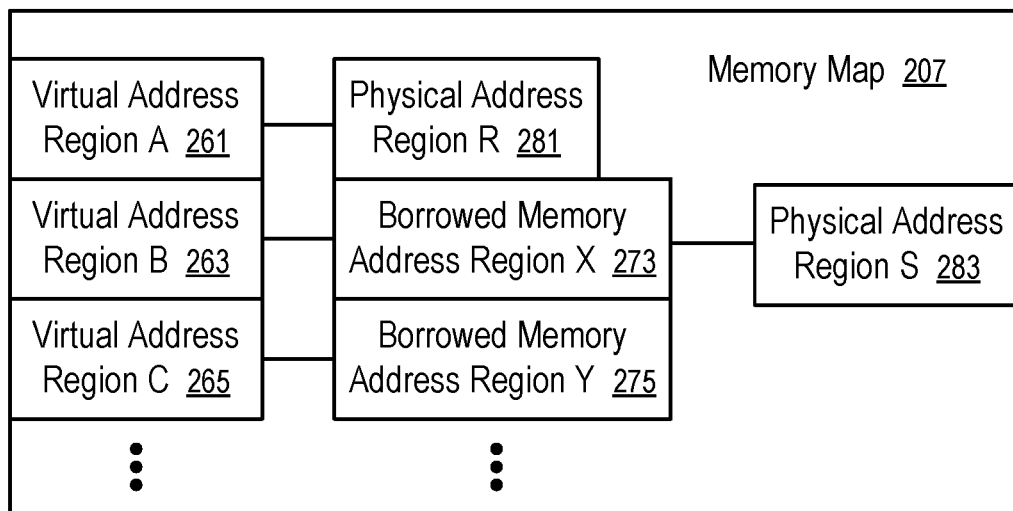
FIG. 3 illustrates a technique to use borrowed memory according to one embodiment.
Figure 3:
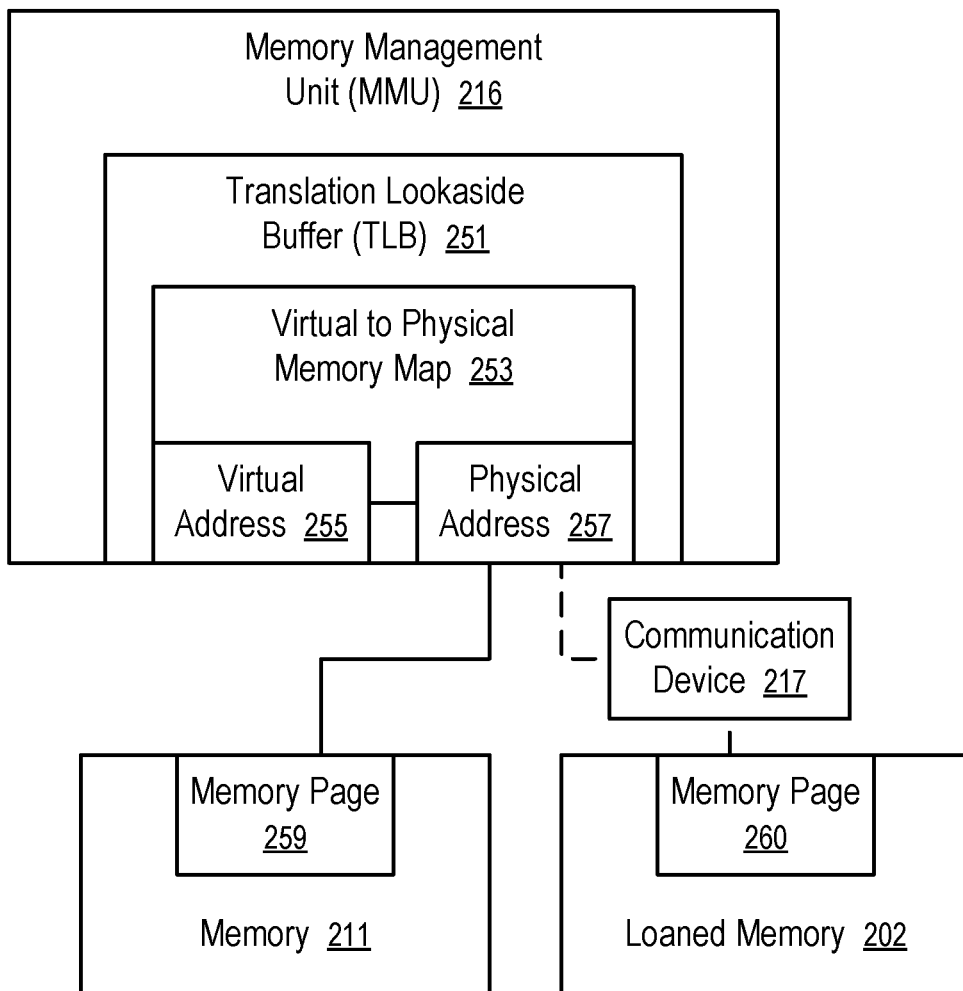

FIG. 3 illustrates a technique to implement borrowed memory according to one embodiment. For example, the technique of FIG. 3 can be implemented in the borrower device (201) illustrated in FIG. 2.

FIG. 3 illustrates memory (211), a memory management unit (MMU) (216) configured to access the memory (211) using physical addresses (e.g., 257), and a memory map (207) that defines mapping between virtual address regions (e.g., 261, 263, 265, . . . ) and address regions where the virtual memory regions are mapped to, such as physical address regions (e.g., 281, 283, . . . ) and borrowed memory regions (e.g., 273, 275, . . . ).

For example, the borrowed memory address regions (e.g., 273, . . . , 275) can be configured to identify the virtual address regions allocated by the lender device (203) as the memory provisioned/loaned to the borrowed device (201).

For example, a virtual address region A (261) is associated with a physical address region (281) in the memory map (207) to indicate that the region of virtual memory is currently directly mapped to the corresponding region of local physical memory (211).

For example, a virtual address region B (263) is associated in the memory map (207) with a borrowed memory address region X (273) and a physical address region S (283) to indicate that the virtual address region B (263) is mapped to the borrowed memory address region X (273) and physically resides in the physical address region S (283). Thus, access to the virtual address region B (263) can be fulfilled through accessing the physical address region S (283) in the local memory (211). Virtual address region C (265) is associated in the memory map (207) with a borrowed memory address region Y (275) and is not associated with any physical address region in the memory map (207). Thus, for accessing the virtual address region C (265) the borrower device needs to communicate with the lender device.

Figure 4:
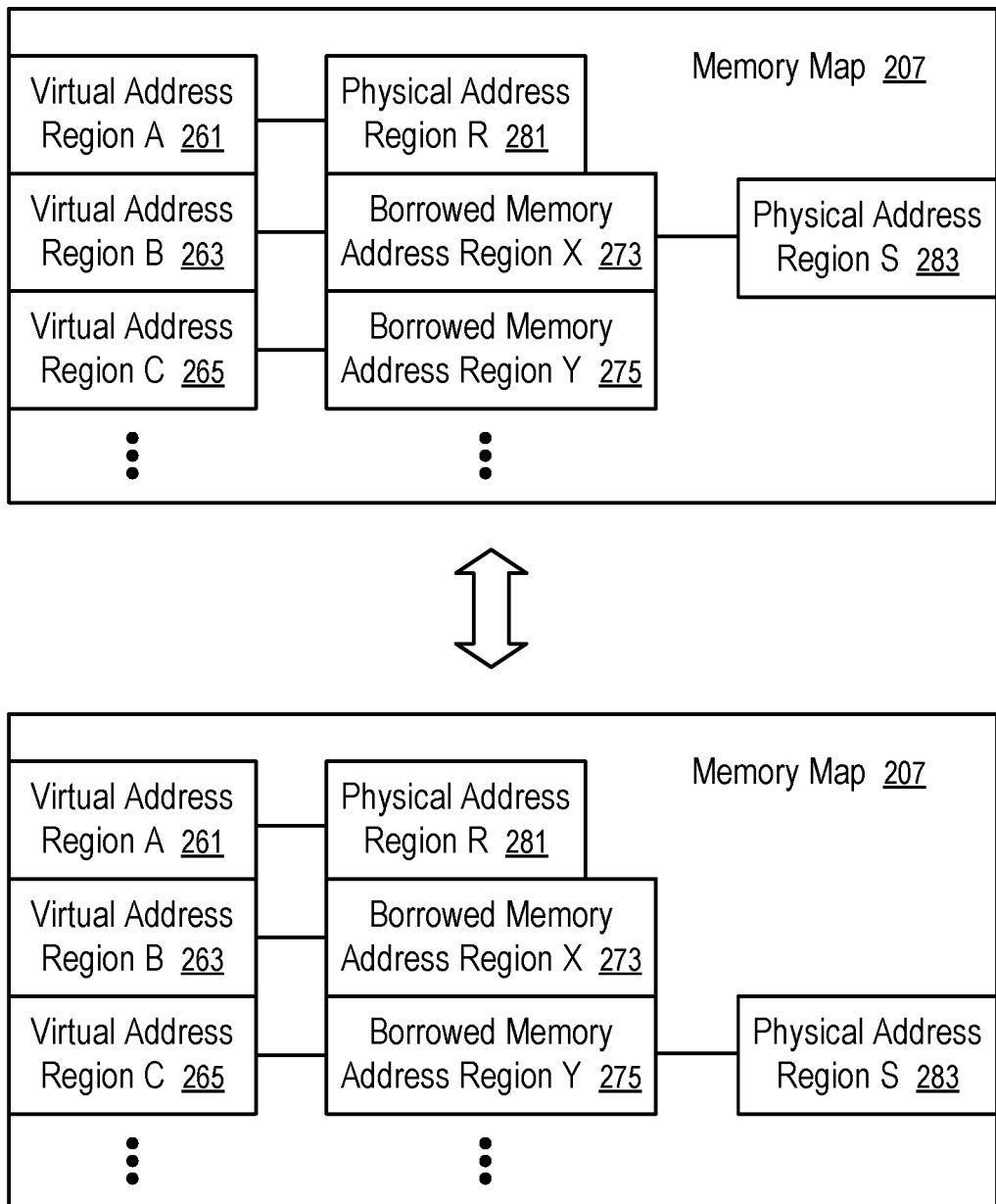
FIG. 4 illustrates the use of a physical memory region to facilitate access to different borrowed memory regions according to one embodiment.

The content in the physical address region S (283) can be evicted to the lender device to free the physical address region S (283). Once the physical address region S (283) is freed, it can be used to for physical placement of another borrowed memory address region, such as the borrowed memory address region Y (275). Once the content of the borrowed memory address region Y (275) is migrated from the lender device to the borrower device to the physical address region S (283), the physical address region S (283) can be used to provide access to the virtual address region C (265) mapped to the borrowed memory address region Y (275) of the unified address space and physically located in the physical address region S (283) of the borrower device, as illustrated in FIG. 4.

Figure 5:
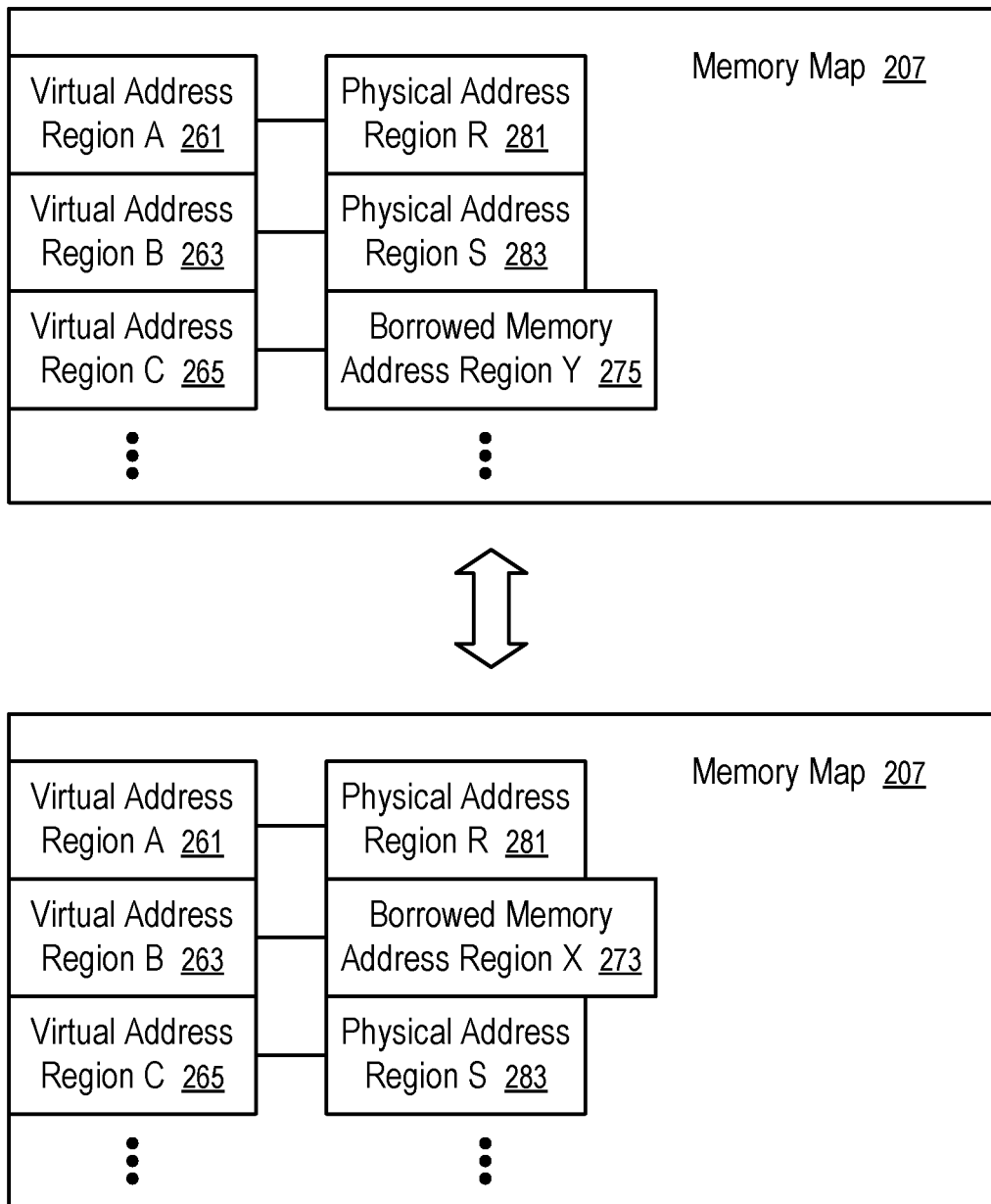
FIG. 5 illustrates another use of a physical memory region to facilitate access to different borrowed memory regions according to one embodiment.

In FIG. 5, the memory management unit (MMU) (e.g., similar to 216 illustrated in FIG. 3) has a translation lookaside buffer (TLB) (e.g., similar to 251 illustrated in FIG. 3) that can store a virtual to physical memory map (253) (e.g., a portion of the memory map (207) maintained by the operating system (213) of the borrower device (201)). When a processor (215) of the borrower device (201) executes an instruction that uses a virtual address (255), the TLB (251) uses the virtual to physical memory map (253) to translate the virtual address (255) into a physical address (257); and the memory management unit (MMU) (216) can use the physical address (257) to access the memory page (259) in the memory (211) (e.g., through a memory bus).

The virtual to physical memory map (253) loaded in the TLB (251) is typically a portion of the memory map (207) managed by the operating system (213) of the borrower device (201). When the processor (215) of the borrower device (201) executes an instruction that uses a virtual address that is not covered in the virtual to physical memory map (253) in the TLB (251), the memory management unit (MMU) (216) can cause the processor (215) to execute the operating system (213), which is programmed to replace a portion of the virtual to physical memory map (253) in the TLB (251), such that the updated virtual to physical memory map (253) in the TLB (251) includes the data for the translation of the virtual address (e.g., 255) to a physical address (e.g., 257).

The memory management unit (MMU) (216) is typically configured to access the memory (211) via a memory bus coupled between the memory management unit (MMU) (216) of the borrower device (201) and the local memory (211) of the borrower device (201). When the virtual address (255) is initially in a virtual address region (e.g., 265) mapped to a borrowed memory address region (e.g., 275), the operating system (213) can migrate the content of this region from loaned memory of the lender device to a physical address region (e.g., 283) in the memory (211) and update the virtual to physical memory map (253) in the TLB (251) to allow the translation of the virtual address (255) into a physical address (257) corresponding to the virtual address (255) directly without translating it to the borrowed memory address region (e.g., 275).

In some embodiments, the memory management unit (MMU) (216) is further configured to access borrowed memory (204) using the communication device (217) over a computer network connection (e.g., 205) without explicit migration. In such a situation, it is not necessary for the operating system (213) to migrate the content of a virtual address region (e.g., 265). The physical address (257) of the borrowed memory (204) can include information for the communication device (217) to access the memory page (260) in the loaned memory (202) in the lender device (203). The memory access request made using the physical address (257) and via the communication device (217) can be processed in the lender device (203) via its operating system (233). Alternatively, the communication device (237) and/or the memory management unit (MMS) (236) can be configured to process such an access request to the loaned memory (202) (e.g., for read or write) without executing the operating system (233) (e.g., based on a virtual to physical memory map cached in the TLB of the MMS (236) of the lender device (203) or a hardware acceleration component configured in the lender device (203) to perform similar operations).

The virtual to physical memory map (253) can be implemented in the form of page table entries.

Figure 6:
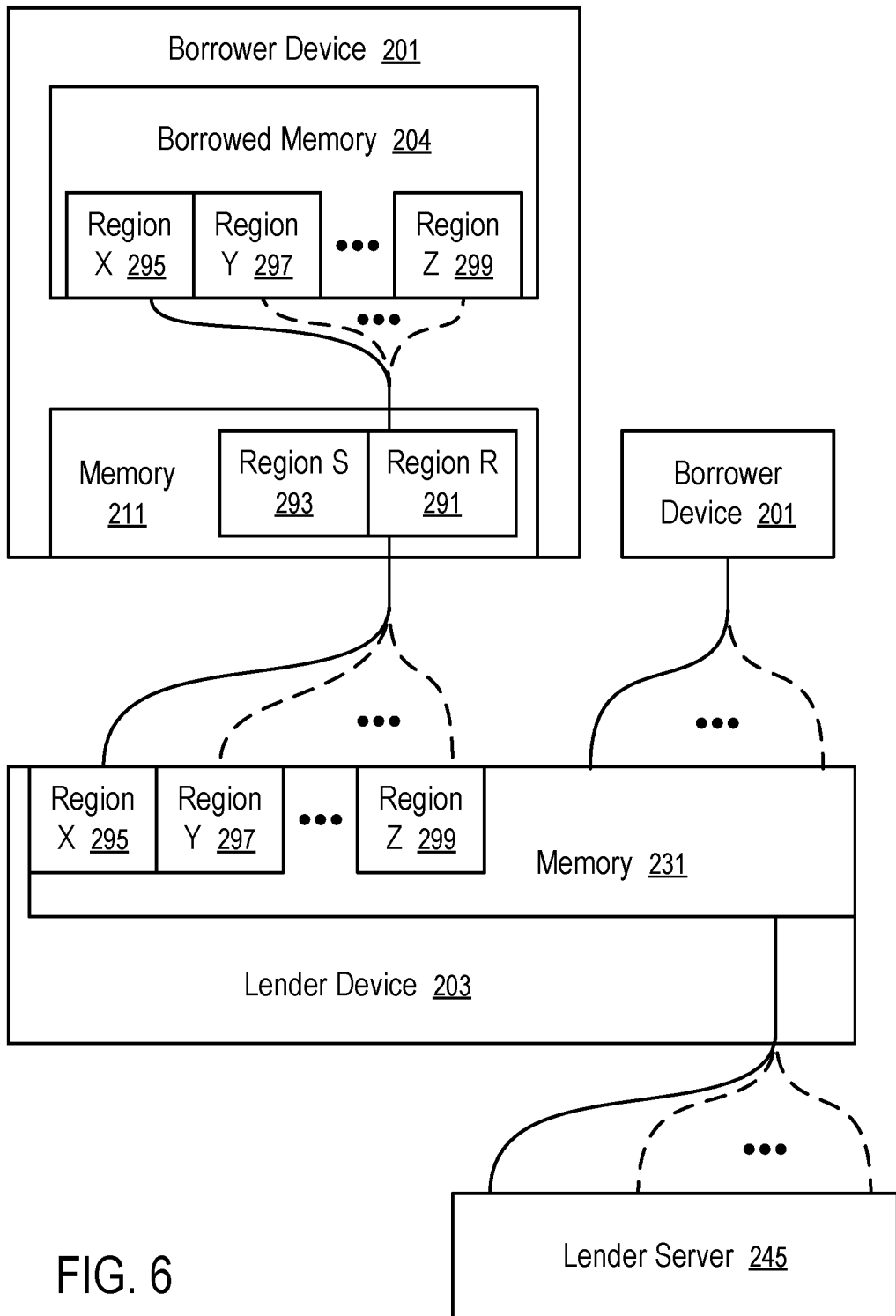
FIG. 6 illustrates a borrower-lender memory hierarchy in a computing system.

FIG. 6 illustrates a borrower-lender memory hierarchy in a computing system.

In FIG. 6, the lender device (203) can borrow memory from one or more lender servers (245) in a way similar to the borrower device (201) borrows memory from the lender device (203) in FIG. 2. The lender device (203) pools at least some of its local physical memory (e.g., 231 illustrated in FIG. 2) and/or some of its memory borrowed from the lender servers (e.g., 245) as available memory (239) for loaning to borrower devices (201). One or more borrower devices (201) can borrow memory from the lender device (203).

A typical borrower memory (204) can have multiple borrowed memory regions (295, 297, ..., 299) and multiple local memory regions (291, 293, ... ). The borrowed memory regions (295, 297, ..., 299) in the borrower device (201) can be accessed via migration from the loaned memory of the lender device to the local memory regions of the borrower device (291, 293, ... ). When the borrowed memory regions (295, 297, ..., 299) are not used in the borrower device (201), they can be evicted back to the lender device (203), as illustrated in FIG. 4 and FIG. 5.

Similarly, the lender device (203) may host a region (e.g., 299) loaned to the borrower device (201) in its local memory, or the local memory borrowed from the lender server (245).

In general, more than one lender devices (203) can be used to provide memory services to a borrower device (201); and more than one lender server (245) can be configured in the hierarchy.

Optionally, the memory (e.g., 295, 297, ..., 299) provided as a service in the hierarchy is configured in a unified virtual address space. Thus, the borrower devices (201), the lender device(s) (203), and the lender server(s) (245) can collaborate in processing data in the memory by referencing the virtual addresses in the unified virtual address space.

For example, the borrower device (201) in FIG. 6 can be the device A (101) or device B (103) in the system of FIG. 1.

For example, the lender device (203) in FIG. 6 can be the device B (103) or server P (105) in the system of FIG. 1.

For example, the lender server (245) in FIG. 6 can be the server P (105) or Q (107) in the system of FIG. 1.

Figure 7:
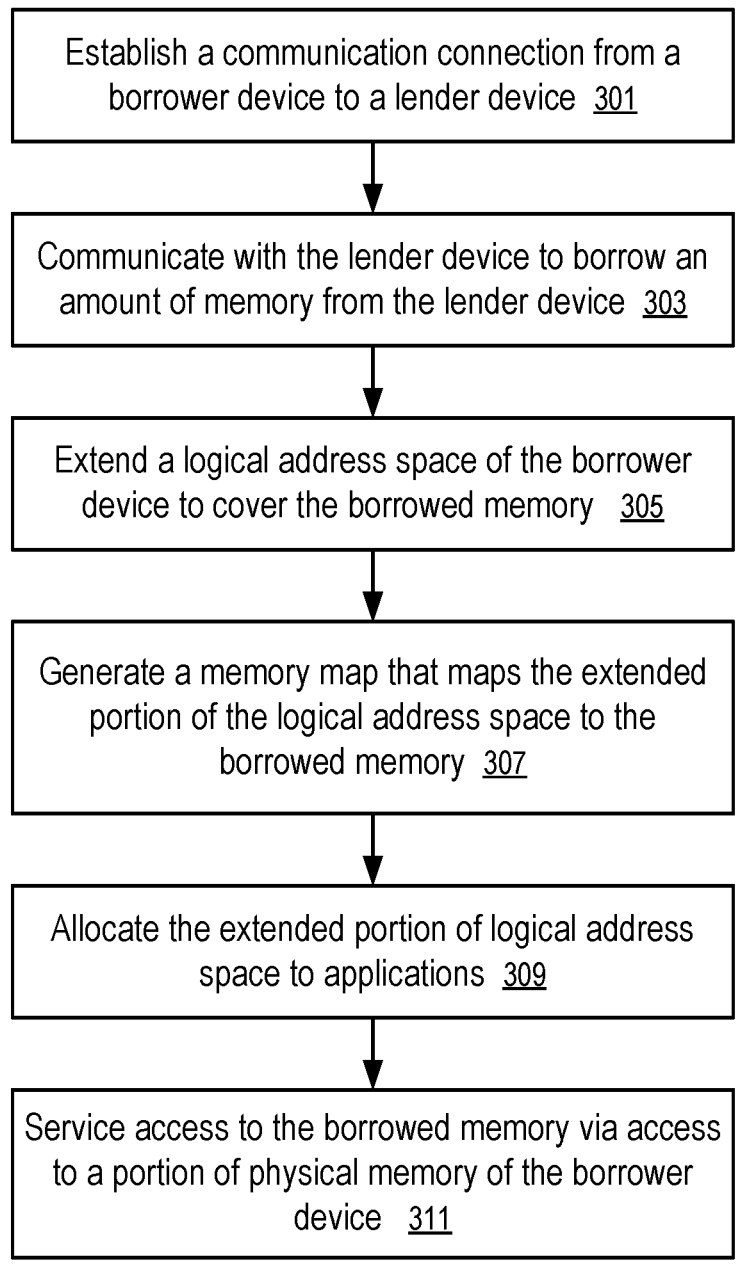
FIG. 7 shows a method to implement inter operating system memory services over communication network connections.

FIG. 7 shows a method to implement inter operating system memory services over communication network connections. For example, the method of FIG. 7 can be implemented in the system of FIG. 1, with a borrower-lender configuration illustrated in FIG. 2, and/or a borrower-lender memory hierarchy illustrated in FIG. 6.

At block 301, a communication connection (205) is established from a borrower device (201) to a lender device (203).

At block 303, the borrower device (201) communicates with the lender device (203) to borrow an amount of memory from the lender device (203). The lender device (203) can allocate loaned memory (203) that is borrowed by the borrower device (201) as the borrowed memory (204) usable by the borrowed memory (204) as virtual memory. By borrowing/loaning memory, the devices (201 and 203) establish a configuration where the processor(s) of the borrower device (201) can read and/or write into the borrowed memory (204)/loaned memory (202). In some instances, the loaned memory (202) is itself a memory borrowed from another lender device (e.g., 245).

At block 305, the operating system (213) of the borrower device (201) extends a virtual/logical address space of the borrower device (201) to cover the borrowed memory (204). The applications (e.g., 212) running on the processor(s) (215) of the borrower device (201) can use the virtual addresses in the space without distinction between borrowed memory (204) and local memory (211).

At block 307, the operating system (213) of the borrower device (201) generates a memory map (207) (e.g., in the form of page tables) that maps the extended portion of the logical address space to the borrowed memory (204).

At block 309, the operating system (213) of the borrower device (201) allocates the extended portion of logical address space to applications (212).

At block 311, the operating system (213) of the borrower device (201) services access to the borrowed memory (212) via access to a portion of physical memory (211) of the borrower device (201).

Figure 8:
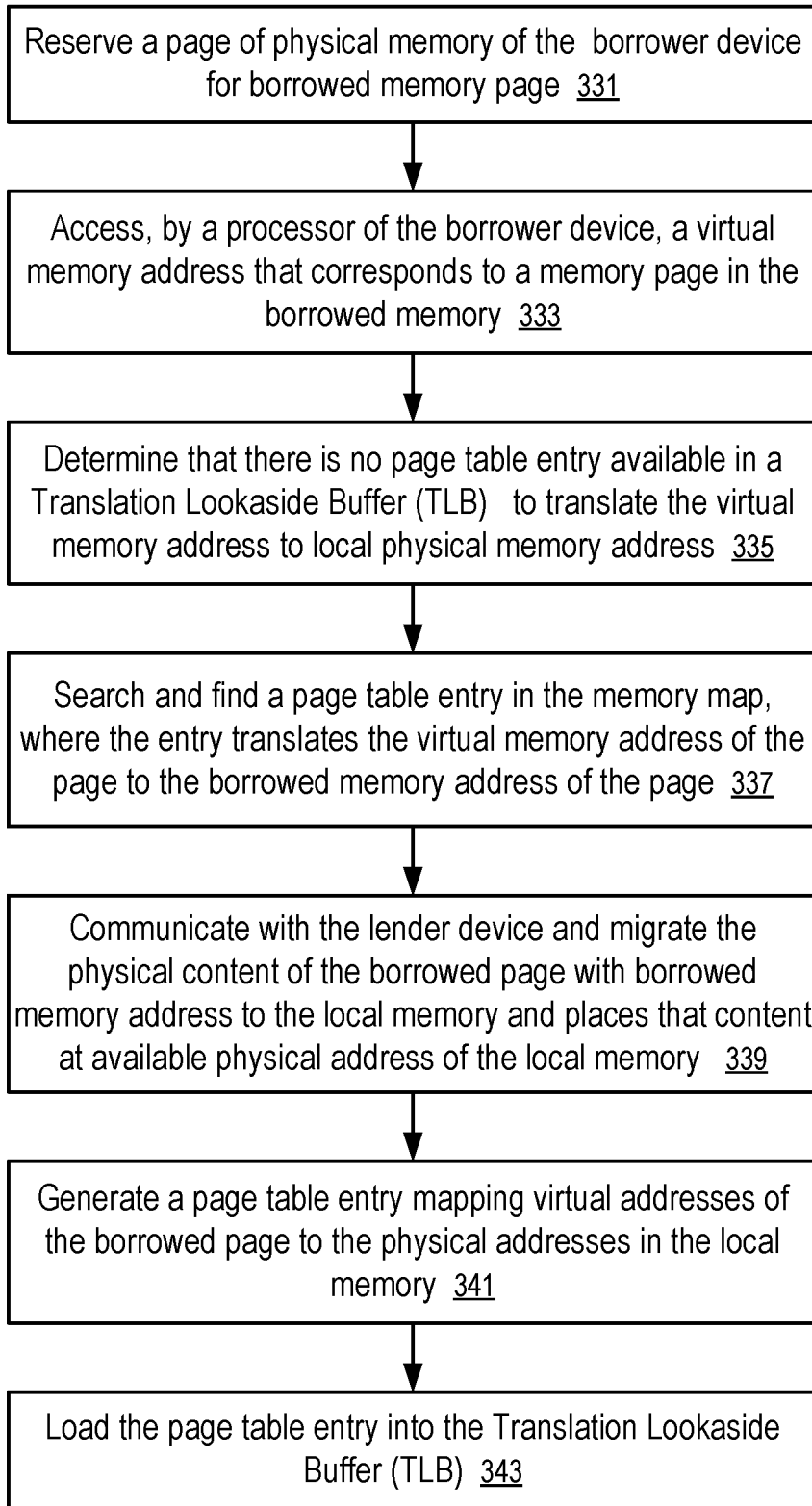
FIG. 8 shows a method to service a page of borrowed memory according to one embodiment.

FIG. 8 shows a method to service a page of borrowed memory according to one embodiment. For example, the method of FIG. 8 can be implemented in the system of FIG. 1, with a borrower-lender configuration illustrated in FIG. 2, and/or a borrower-lender memory hierarchy illustrated in FIG. 6. For example, the method of FIG. 8 can be used to implement the block 311 of the method of FIG. 7.

At block 331, a borrower device (201) reserves a page of physical memory (211) of the borrower device (201) for borrowed memory page (204).

At block 333, a processor of the borrower device (201) accesses a virtual memory address (255) that corresponds to a memory page (260) in the borrowed memory (204). A borrowed memory page (204) can be physically in the loaned memory (202) of a lender device (203).

At block 335, the memory management unit (MMU) (216) of the borrower device (201) determines that there is no page table entry available in a Translation Lookaside Buffer (TLB) (251) to translate the virtual memory address (255) to local physical memory address. Such a determination (e.g., TLB miss) causes the borrower device (201) to run its operating system (213) to search for page table entry in the memory map.

At block 337, the operating system (213) running on the borrower device (201) identifies a page table entry in the memory map that translates the virtual memory address of the page to the borrowed memory address of the page.

At block 339, the operating system (213) running on the borrower device (201) communicates with the lender device and migrates the physical content of the borrowed page with borrowed memory address to the local memory and places that content at available physical address of the local memory. Borrowed page eviction of a different borrowed page from borrower device to lender device may need to be performed when there is not enough local memory for the page migration of the borrowed page from lender device to borrower device.

At block 341, the operating system (213) running on the borrower device (201) generates a page table entry mapping virtual addresses (e.g., 255) of the borrowed page to the physical addresses (257) in the local memory.

At block 343, the operating system (213) running on the borrower device (201) loads the page table entry into the Translation Lookaside Buffer (TLB) (251), which allows the processor to continue accessing the virtual memory address (255) using the translated physical memory address (257).

In some situations, the computer network connection (205) between the borrower device (201) and the lender device (203) have a limited and/or degrading communication bandwidth. The borrower device (201) can throttle the network traffic/bandwidth allocated to different memory regions based on the criticality of the memory regions.

For example, pages of borrowed memory (204) can be tagged with criticality indicators based on the category of the content stored in the memory, the priority ranks of applications using the borrowed memory, and/or the data criticality levels suggested by the applications. When the connectivity bandwidth between the borrower device (201) and the lender device (203) degrades, the least critical pages can be configured to be less accessible, by allocating less communication bandwidth for fetching, retiring, eviction, and/or migration of such pages. Access to the least critical pages can be slowed and/or temporarily cut off, in view of the degradation in the connectivity bandwidth between the borrower device (201) and the lender device (203).

The operation of cessation memory can be prepared via quiescing or suspending an application that attempts a demand load from that memory. The application may not make forward progress during that time. It is possible to perform a graceful degradation when an application is cut off from accessing borrowed memory. An application can be made aware that a load or store operation could result in being suspended; and a vastly different programming paradigm can be used. For example, each memory access can be wrapped in a try-catch exception wrapper. However, such an approach has significant cost. Further, the application can be handled to gracefully handling such exception. For example, the application can hold some context open, and manage that context, relating to the aborted load/store operation, informing the data movement infrastructure whether that load/store still needs to be serviced eventually.

When the borrowed memory pages are throttled according to criticality, applications running on the borrowed memory (204) can still gracefully degrade without catastrophic failure, and proceed with reduced functionality with less reachable/usable content.

For example, a media library can prioritize its content based on usage frequency, usage history, and/or predicted usage. The priority can be used in the determination of the criticality of the borrowed memory pages in which the contents are stored. Thus, access to the less critical contents in the borrowed memory can be restricted and/or cut off with reduced impact on the usability of the media library.

Figure 9:
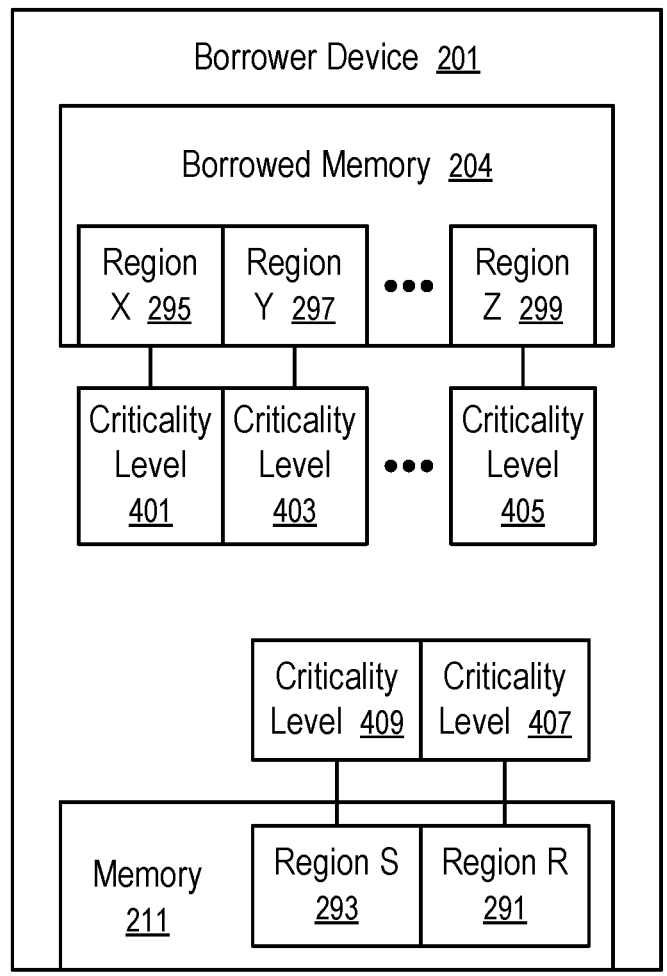
FIG. 9 shows a borrower device having memory regions of different criticality levels based on which network traffics for memory as a service can be throttled.

FIG. 9 shows a borrower device (201) having memory regions of different criticality levels (or priority levels) based on which network traffics for memory as a service can be throttled. For example, the borrower device (201) can be implemented in a way illustrated in FIG. 2 and/or can borrow memory in a hierarchy illustrated in FIG. 6, or in a system illustrated in FIG. 1.

In FIG. 9, the memory regions (295, 297, . . . , 299) in the borrowed memory (204) can be labeled with criticality levels (401, 403, . . . , 405) respectively. The criticality levels (401, 403, . . . , 405) rank the relative priorities among the memory regions (295, 297, . . . 299). Network bandwidth used for the communications between the borrower device (201) and its lender device(s) (e.g., 203) can be allocated according to the criticality levels (401, 403, . . . , 405).

For example, when multiple regions (e.g., 295, 297) need to be migrated from the lender device (203) to the borrower device (201), the regions (e.g., 295, 297) can be migrated in an order according to their criticality levels (e.g., 401, 403). In such an arrangement, repeated requests to memory regions of high criticality levels may indefinitely delay the access to memory regions of low criticality.

Alternatively, the bandwidth may be shared among the multiple regions (e.g., 295, 297) of different criticality levels. For example, the amounts of data communications over the network connection (205) allowed for different regions within a given time period can be allocated according to a ratio determined based on the criticality levels of the memory regions. Thus, fetching the content of a memory page of a low criticality level will take a longer time than fetching the content of a memory page of a high criticality level. However, the fetching of the low criticality page is not going to be completely blocked by the fetching of the high criticality page. Further, the ratio can be adjusted based on the overall available bandwidth such that the performance of accessing a high criticality page can degrade less severely than the low criticality page when the overall available bandwidth degrades. Thus, the user experience with the applications running in the borrower device can be optimized via selectively degrading the access speeds of less critical aspects.

In FIG. 9, the contents in the memory regions (e.g., 291, . . . , 293) in the local memory (211) can also be labeled with criticality levels (e.g., 407, . . . , 409). The criticality levels (e.g., 407, . . . , 409) can be used to arrange predictive eviction or migration of less critical contents to the borrowed memory (204) in anticipation of significant degradation in overall available bandwidth.

For example, in a particular model of bandwidth sharing at sub-page granularity, a link level bandwidth management capability or a forced chunking on the link can be used. Such an implementation may be lead to potentially inefficient non-throttle scenarios. Alternatively, when the granularity of management is the page (instead of sub-page), the rate of pages fetched may be slow, not the actual time it takes for a single page to be fetched. With certain implementations, fetching the content of a memory page of a low criticality level can take a longer time than fetching the content of a memory page of high criticality level. In other implementations, the duration of time taken to fetch a low criticality page can substantially stay constant but the rate at which groups of low criticality pages can be fetched can slow relative to groups of high criticality pages.

For example, in some instances, a borrower device (201) borrows memory from several lender devices (e.g., 103, 105, and/or 107). For example, the borrower device (201) can instruct one lender (e.g., 105 or 107) to transfer or copy a memory page loaned to the borrower device (201) to another lender (e.g., 103 or 105) directly. Alternatively, the borrower device (201) can migrate the memory page from one lender (e.g., 105 or 107) to the local memory, and then evict the page to another lender (e.g., 103 or 105).

Figure 10:
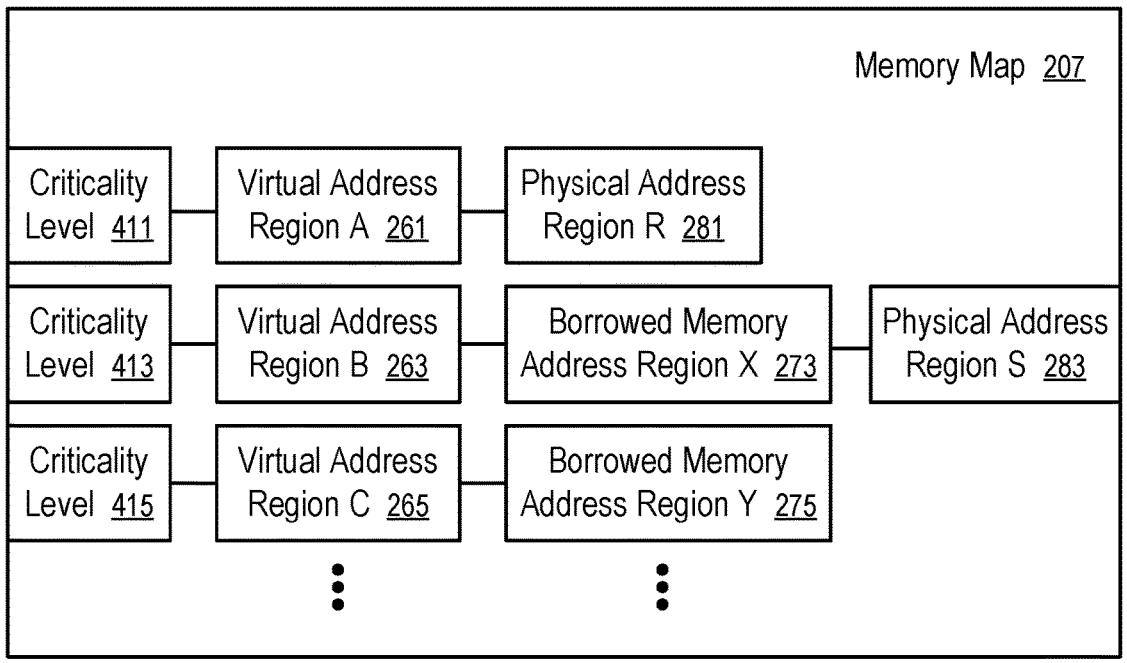
FIG. 10 illustrates tagging criticality levels of memory regions in a memory map according to one embodiment.

FIG. 10 illustrates tagging criticality levels (or priority levels) of memory regions in a memory map according to one embodiment. For example, the memory map of FIG. 10 can be used to implement the criticality labeling in FIG. 9.

In FIG. 10, the virtual memory address regions (261, 263, 265, . . . ) can be mapped to physical address regions (282, 283) and borrowed memory address regions (273, 275, . . . ), in a way similar to that in FIG. 3, 4, or 5. For example, the memory map (207) can be specified in the form of page tables.

Further, for each of the virtual address regions (261, 263, 265, . . . ), the memory map (207) can include a criticality level (e.g., 411, 413, or 415). The criticality level (e.g., 411, 413, or 415) can be used to determine the share of bandwidth the virtual address region (e.g., 261, 263, or 265) can use to communicate data between the borrower device (201) and the lender device (203).

Figure 11:
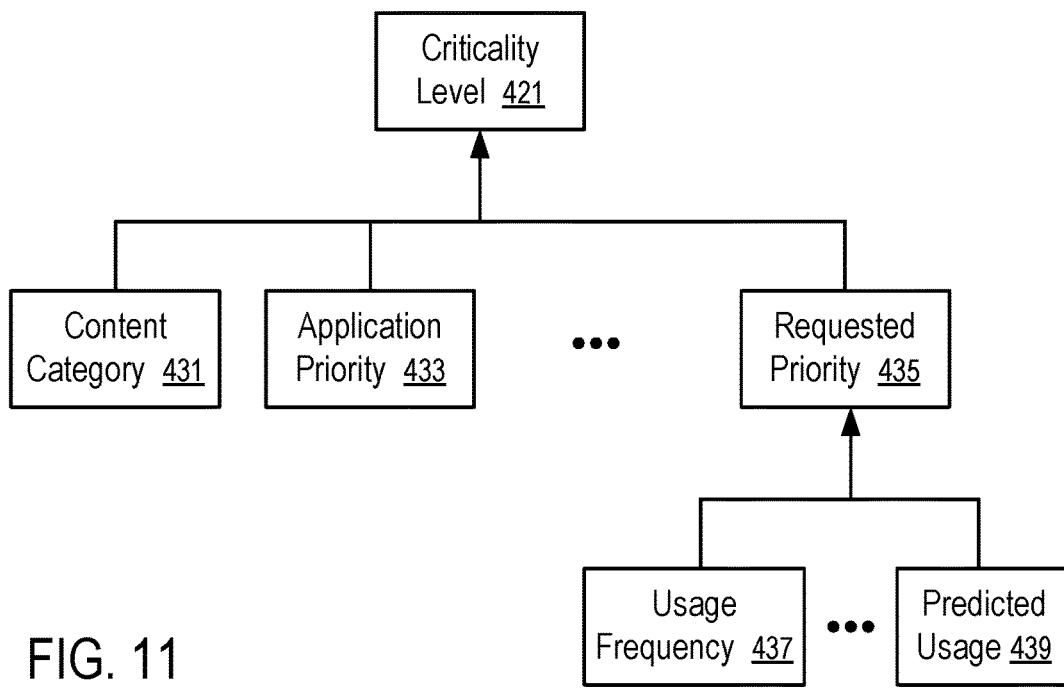
FIG. 11 illustrates a method to identify the criticality level of a memory region according to one embodiment.

FIG. 11 illustrates a method to identify the criticality level/priority level of a memory region according to one embodiment. For example, the method of FIG. 11 can be used to determine any of the criticality levels (e.g., 401 to 415) in FIGS. 9 and 10.

In FIG. 11, the criticality level (421) of the content of a memory region can be determined based on the content category (431), the priority (433) of the application (e.g., 212) in control of the content, and/or the priority requested by the application (e.g., 212) for the content.

Different content categories can have predetermined weights. When an application allocates a memory page for storing data, the application can identify the content category (431) of the memory page, such as application state, historical/log data, media, sensor data, etc. The operating system (213) can assign predetermined weights for the criticality based on the content category (431).

Different applications can have predetermined weights for their criticality. A user of a user device may value the experience with one application (212) more than the experience with another application and thus customize the weight assignments to different applications. In some instances, different applications may have inter-dependency. Thus, an application that provides important services to other applications can be assigned a higher priority (433).

Different subsets of data of a same application and of a same content category (431) may have different priorities (435). When the application (212) is programmed to request a customized priority (435), the application (212) can make improved predictions (e.g., 439) based on information that may not be available to the operating system (213). When the application (212) does not request a customized priority (435), the operating system (213) can track the memory usage of the application (212) and request usage-based priority (435) for the content.

A predetermined function can be used to combine the content category (431), the application priority (433), . . . , and/or the requested priority (435) to generate the criticality level (421). For example, weights can be calculated for the content category (431), the application priority (433), . . . , the requested priority (435) and summed up to obtain a total weight as the criticality level (421). For example, the priorities (433 . . . , 435) can be summed to generate a weight that is applied to increase or decrease the weight of content category (431) through multiplication.

Figure 12:
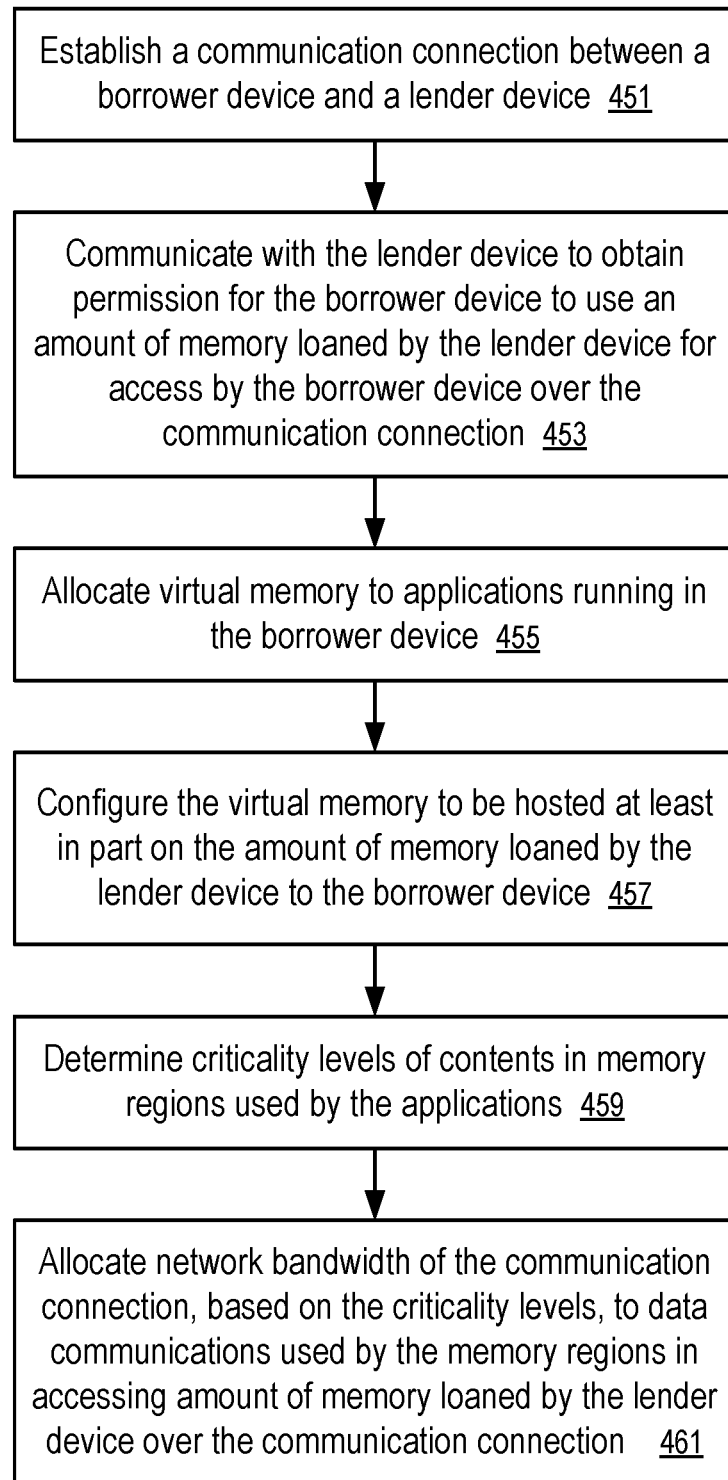
FIG. 12 shows a method to throttle network communications for memory as a service according to one embodiment.

FIG. 12 shows a method to throttle network communications for memory as a service according to one embodiment. For example, the method of FIG. 12 can be implemented in the borrower device (201) illustrated in FIG. 2, 6, or 9. For example, the method of FIG. 12 can be implemented as the device A (101), the device B (103), or the server P (105) of FIG. 1 in borrowing memory.

At block 451, a communication connection (e.g., 205) is established between a borrower device (201) and a lender device (203). For example, the connection (205) can be over the networks and/or Internet (109) illustrated in FIG. 1.

At block 453, the borrower device (201) communicates with the lender device (203) to obtain permission for the borrower device (201) to use an amount of memory (202) loaned by the lender device (203) for access by the borrower device (201) over the communication connection (205).

At block 455, the operating system of the borrower device (201) allocates virtual memory to applications (e.g., 212) running in the borrower device (201).

At block 457, the operating system of the borrower device (201) configures the virtual memory to be hosted at least in part on the amount of memory (202) loaned by the lender device (203) to the borrower device (201).

At block 459, the borrower device (201) determines criticality levels (e.g., 401 to 415) of contents in memory regions (e.g., 291 to 299, 261 to 265, 273 to 275, and 281 to 283) used by the applications (e.g., 212).

At block 461, the borrower device (201) allocates network bandwidth of the communication connection (212), based on the criticality levels, to data communications used by the memory regions in accessing the amount of memory (202) loaned by the lender device (203) over the communication connection (205) to the borrower device (201).

The memory loaned by the lender device (203) can be in part borrowed by the lender device (203) from another device (e.g., 245).

The criticality levels (e.g., 401 to 415, 421) can be identified based at least in part on categories (431) of the contents, priorities (433) of the applications (e.g., 212) controlling the contents, or priorities (435) requested for the contents by the applications (e.g., 212), or any combination thereof.

For example, the applications (e.g., 212) can request the priorities (435) for the contents stored in the memory regions based on usage histories of the contents, predicted usages (e.g., 439) of the contents in a subsequent period of time, or usage frequencies (e.g., 437) of the contents, or any combination thereof. In some instances, the operating system (213) can collect the usage histories, determine predicted usages (e.g., 439) and/or usage frequency (e.g., 437), and/or calculate the requested priority (435) on behalf of an application (e.g., 212).

To allocate the network bandwidth, the operating system (213) of the borrower device (201) or the communication device (217) of the borrower device (201), can throttle/control the amounts of data communications used in a period of time for the memory regions over the communication connection in accessing the amount of memory (202), loaned by the lender device (203) to the borrower device (201), according to a ratio corresponding to the criticality levels of the contents in the memory regions. Thus, during the period of time, the communications used for the memory regions can be seen as being allowed according to the ratio; and the average speeds of the data communications for the different memory regions can be controlled to be proportional to the ratio.

In some instances, the borrower device (201) can predict the degradation in the network bandwidth of the communication connection in a subsequent period of time. In response, the operating system (213) can adjust hosting of virtual memory between local memory (211) of the borrower device and the amount of memory (203) loaned by the lender device (203) to the borrower device (201), according to the criticality levels of contents in the memory regions.

For example, the operating system (213) of the borrower device (201) can identify a first memory region having a criticality level lower than a second memory region. The operating system (213) can reconfigure the hosting of virtual memory such that a virtual memory region associated with the first memory region is migrated from being hosted or cached in the local memory (211) to being hosted in the amount of memory (202) loaned by the lender device (203) to the borrower device (201); and a virtual memory region associated with the second memory region can be migrated from being hosted in the amount of memory (202) loaned by the lender device (203) to the borrower device (201) to being hosted or cached in the local memory (211) of the borrower device (201).

In some embodiments, the memory management units (MMU) of computing devices are configured to accelerate the access to borrowed memory over a network connection.

For example, a memory management unit (MMU) (216) of a borrower device (201) can be configured not only to access the local random access memory (211) of the borrower device (201) over a memory bus, but also to use a communication device (217) to access borrowed memory (204) that is hosted in the loaned memory (202) of a lender device (203) over a network connection (205). The memory management units (MMU) (216) can access the loaned memory (202) in the lender device (203) using the communication device (217) in accordance with a physical address (257) translated from a virtual address (255) by the memory management units (MMU) (216), without a need to cause the processor(s) (215) of the borrower device (201) to execute instructions of its operating system (213).

For example, some routine operations performed by an operating system (213) in accessing the loaned memory (202) can be implemented in the memory management unit (MMU) (216), such that the routine operations can be performed without the processor(s) (215) executing instructions in their execution units. Such MMU implementation/support can improve the efficiency of the processor(s) (215) in accessing borrowed memory (204) that is physically in the loaned memory (202) of the lender devices (203).

In general, an operating system (213) can be programmed to handle more situations than what the memory management unit (MMU) (216) can handle. For example, when communications to access the loaned memory (202) over a network connection (205) encounter exceptional conditions that are beyond processing capability of the memory management unit (MMU) (216), the operating system (213) can be executed to handle such situations.

Figure 13:
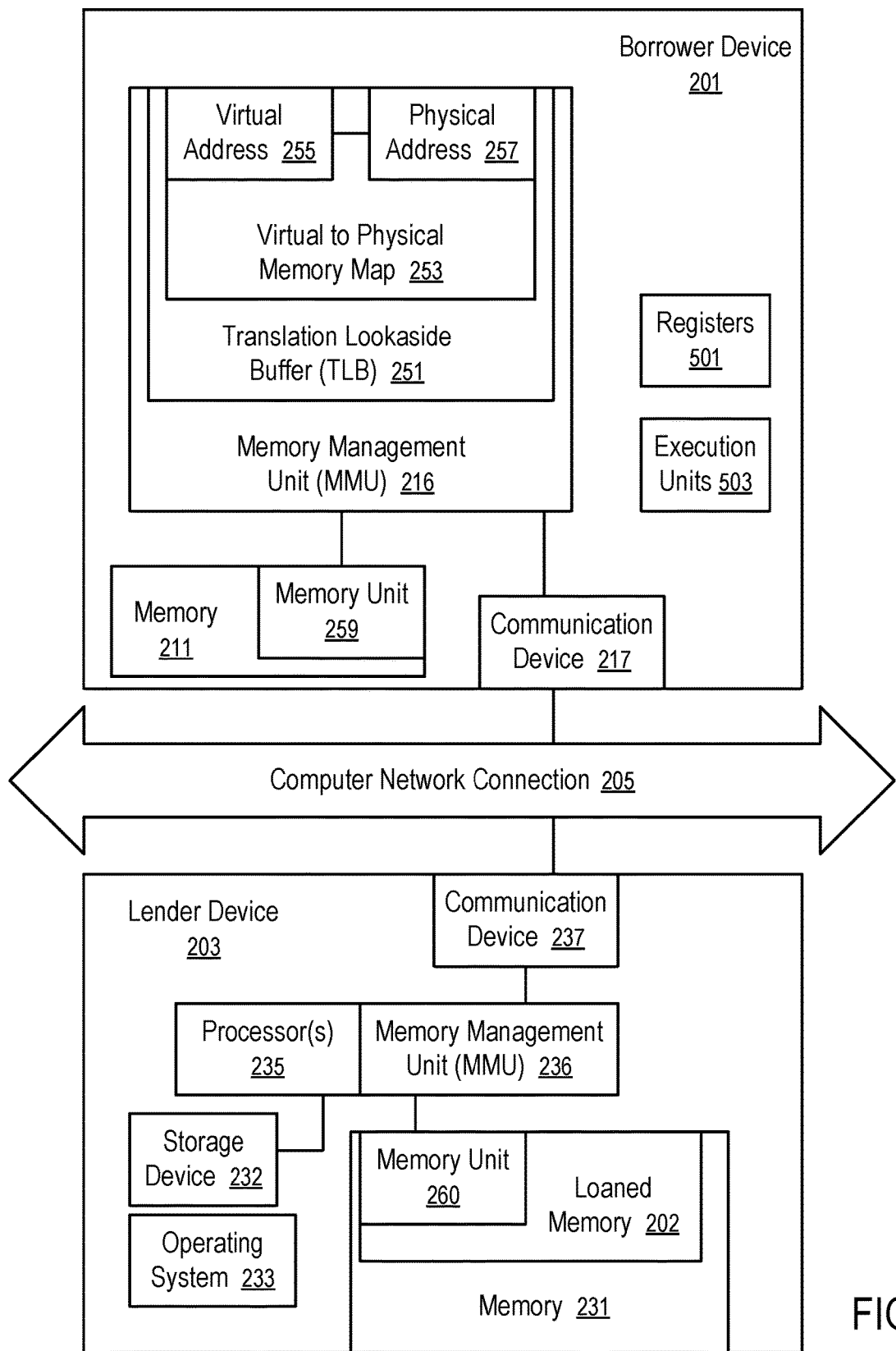
FIGS. 13-15 illustrate hardware accelerated configurations to access borrowed memory according to some embodiments.
Figure 14:
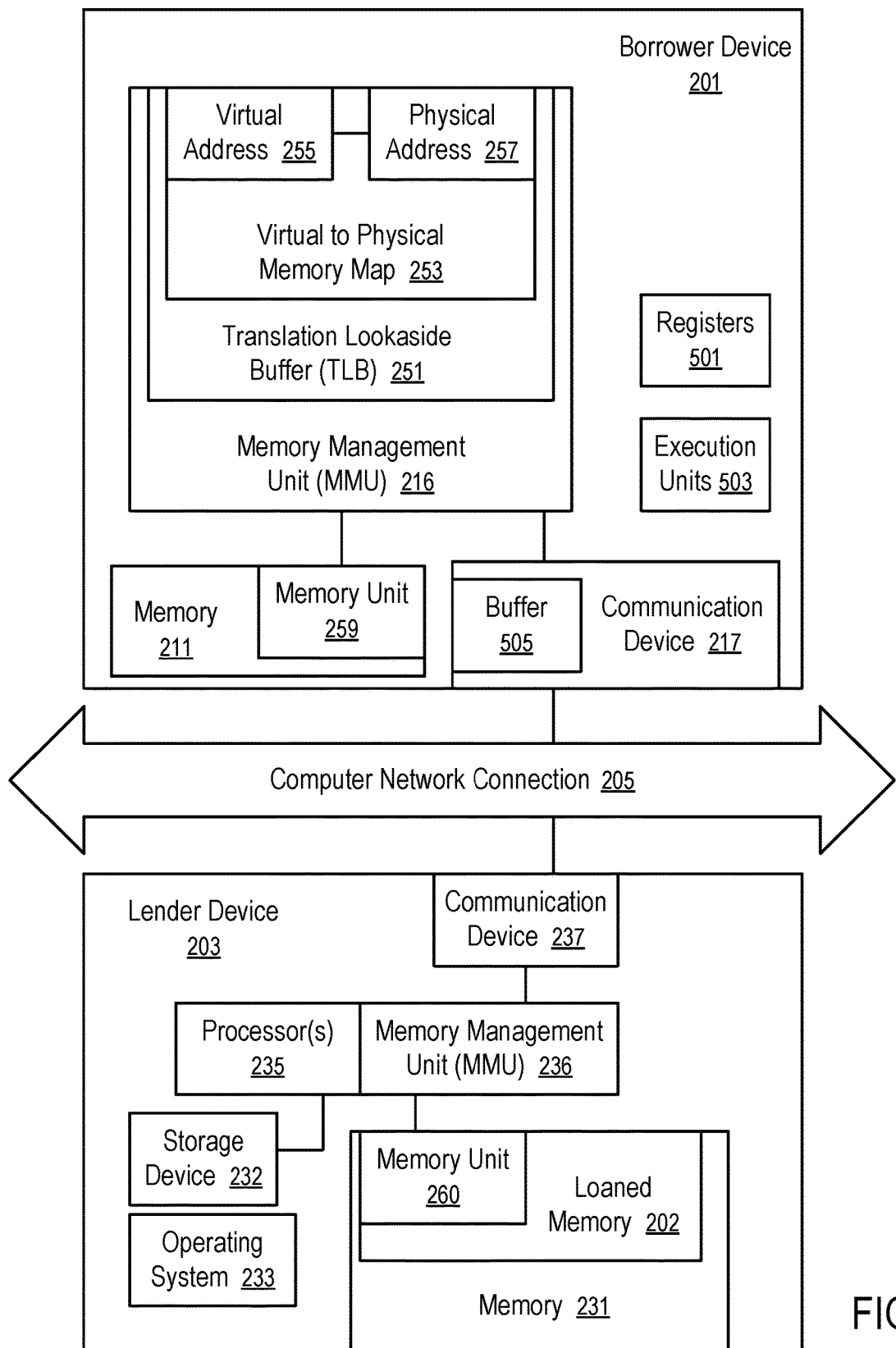
Figure 15:
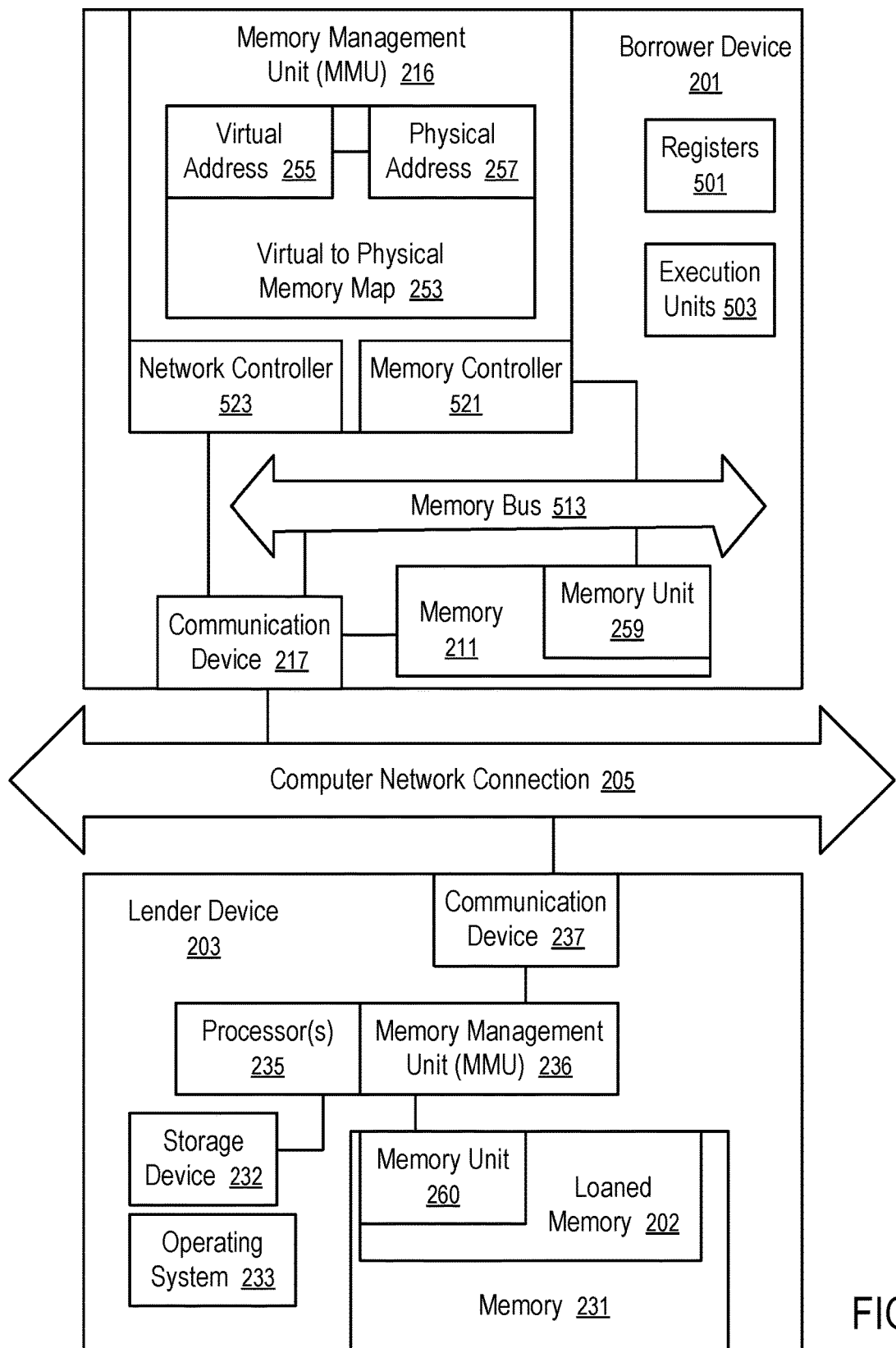

FIGS. 13-15 illustrate hardware accelerated configurations to access borrowed memory according to some embodiments. For example, the techniques of FIGS. 13-15 can be implemented in the system of FIG. 1 or 6, with the memory service techniques of FIG. 2 and the memory mapping techniques of FIG. 3.

In FIG. 13, the memory management unit (MMU) (216) of the borrower device (201) is configured to have a connection to the local random access memory (211) and a connection to the communication device (217) of the borrower device (201). In some instances, the communication device (217) is part of the memory management unit (MMU) (216).

A virtual to physical memory map (253) cached in the translation lookaside buffer (TLB) (251) contains information to translate a virtual address (256) to a physical address (257).

When an instruction is executed in the execution units (215) of the borrower device (201), a virtual address (255) stored in one of the registers (501) and/or generated by the execution units can be used to load an instruction, retrieve an operand, and/or store a computation result. In such a situation, the borrower device (201) accesses the virtual memory identified by the virtual address (255).

When the virtual memory identified by the virtual address (255) is hosted in a memory page (259) in the local memory (211), the physical address (257) is configured to be sufficient for the memory management unit (216) to address the memory page (259) for a memory operation (e.g., read or write).

When the virtual memory identified by the virtual address (255) is hosted in a memory page (260) in the loaned memory (202) that is physically inside the lender device (203), the physical address (257) is configured to include sufficient information for the communication device (217) to transmit the access request to the lender device (203) over the computer network connection (205).

For example, when the virtual memory identified by the virtual address (255) is hosted in a memory page (260) in the loaned memory (202), the physical address (257) can include a network address of the lender device (203) and a virtual memory address in a virtual memory space serviced by the operating system of the lender device (203). The memory management unit (MMU) (216) requests the communication device (217) to transmit an access request to the lender device (203) using the network address; and the access request includes the virtual address that identifies the memory page (260) in the lender device (203).

When the communication device (237) receives the access request, the communication device (237) can be configured to instruct the memory management unit (MMU) (236) to access the memory page (260) identified by the virtual address included in the access request from the borrower device (201), in a way similar to the processor(s) (235) instructing the memory management unit (MMU) (236) to access a virtual address. In some instances, the communication device (237) is part of the memory management unit (MMU) (236).

For example, when the virtual address is translated into a physical address of the memory page (260) using a virtual to physical memory map of the lender device (203), the memory management unit (MMU) (236) performs the address translation and uses the physical memory address to access the memory page (260). When the virtual to physical memory map for the translation of the virtual address is not already in the memory management unit (MMU) (236) of the lender device (203), the operating system (233) of the lender device (203) can be executed to load a relevant portion of the virtual to physical memory map into the memory management unit (MMU) (236) of the lender device (203) such that the memory management unit (MMU) (236) can perform the address translation to access the memory page (260).

In some instances, the lender device (203) can host the virtual address used by the borrower device (201) in the storage device (232). In response to a failure/page fault in the memory management unit (MMU) (236) to translate the virtual address, the memory management unit (MMU) (236) causes the processor(s) (235) to execute the operating system (233), which loads the data content from the storage device (232) into the loaned memory (202), updates the translation lookaside buffer (TLB) of the memory management unit (MMU) (236) to facilitate the access. Alternatively, the operating system (233) may service the access request directly from the storage device, without caching or buffering or re-hosting it in the local memory (231) of the lender device (203).

In some instances, the lender device (203) can host the virtual address used by the borrower device (201) in another lender device (e.g., 205). In such a situation, the lender device (203) can access its lender (e.g., 205) in a way similar to the borrower device (201) accessing the lender device (203).

Optionally, when the virtual address (255) being accessed in the one of the execution units (215) of the borrower device (201) is translated into the physical address (257) for access via the communication device (217), the communication device (217) can migrate a virtual address region from the lender device (203) into the buffer (505) of the communication device (217), as illustrated in FIG. 14.

For example, when a virtual address (256) in a page of virtual memory is being accessed, the communication device (217) can migrate the entire page (or a portion of it) into the buffer (505) of the communication device (217) in anticipation of further accesses to the page.

Alternatively, the memory management unit (MMU) (216) of the borrower device (201) can be configured to reserve a portion of the local random access memory (211) as a buffer for caching a portion of the loaned memory (203), as illustrated in FIG. 15.

Optionally, the memory management unit (MMU) (216) of the borrower device (201) can be further configured to manage the adjustment of hosting of virtual memory regions identified in the virtual physical memory page (253) in a way similar to that illustrated in FIG. 5.

For example, when the memory management unit (MMU) (216) determines that a virtual region hosted in the loaned memory (202) of the lender device (203) is accessed more frequently and/or recently than a virtual region hosted in the local memory (211), the memory management unit (MMU) (216) can use the communication device (217) to migrate the more frequently and/or recently accessed virtual region into being hosted in the local memory (211) and evict the less frequently and/or recently accessed virtual region into being hosted in the loaned memory (202). Thus, the memory management unit (MMU) (216) can optimize the hosting of virtual memory regions identified in the virtual to physical memory map (253) cached in the translation lookaside buffer (TLB) (251) and update the virtual to physical memory map (253) cached in the translation lookaside buffer (TLB) (251) according to the adjustments. The operating system (213) of the borrower device (201) can be used to further adjust hosting of other virtual memory regions.

Figure 16:
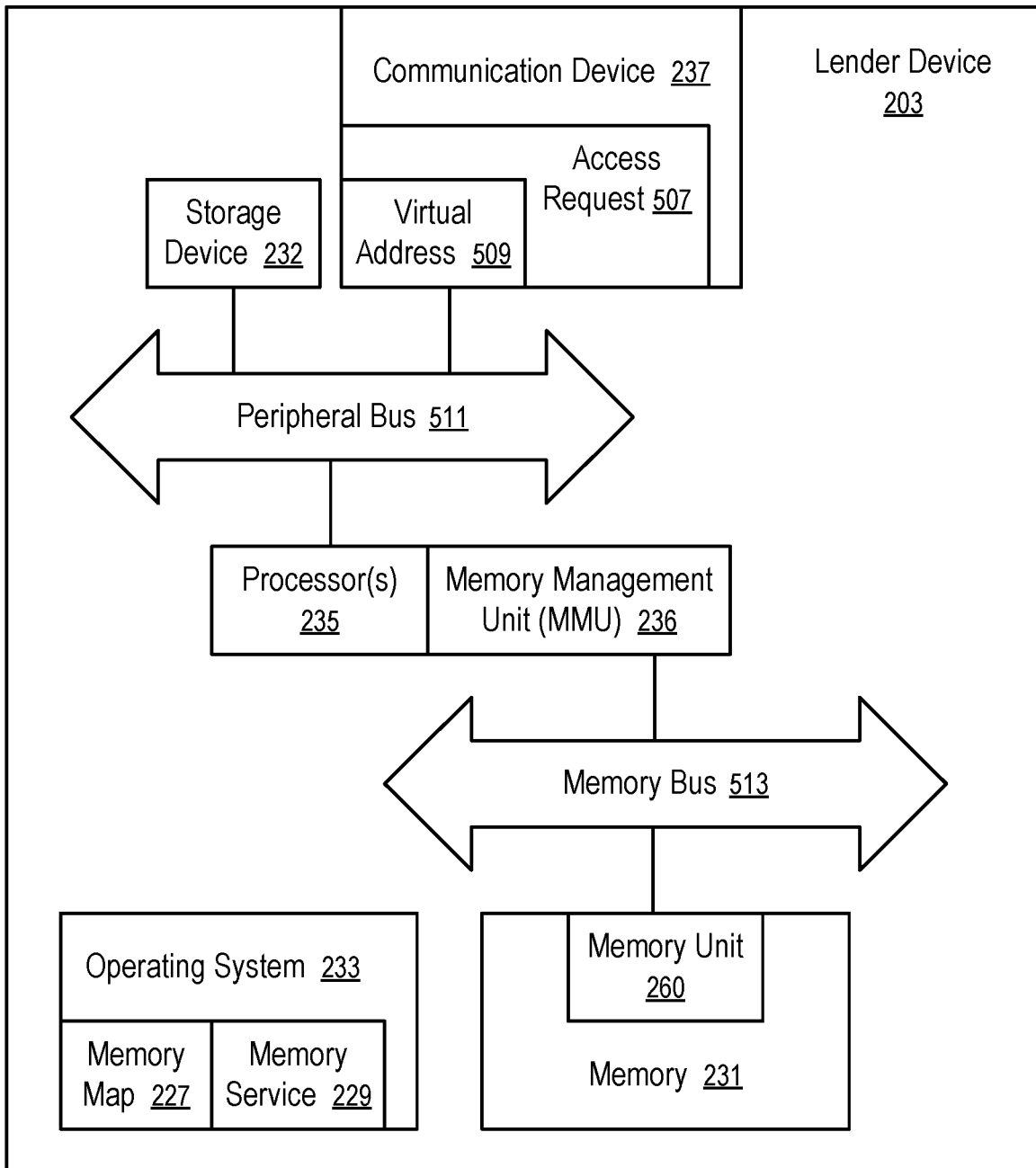
FIGS. 16 and 17 illustrate hardware accelerated configurations to provide access to loaned memory according to some embodiments.
Figure 17:
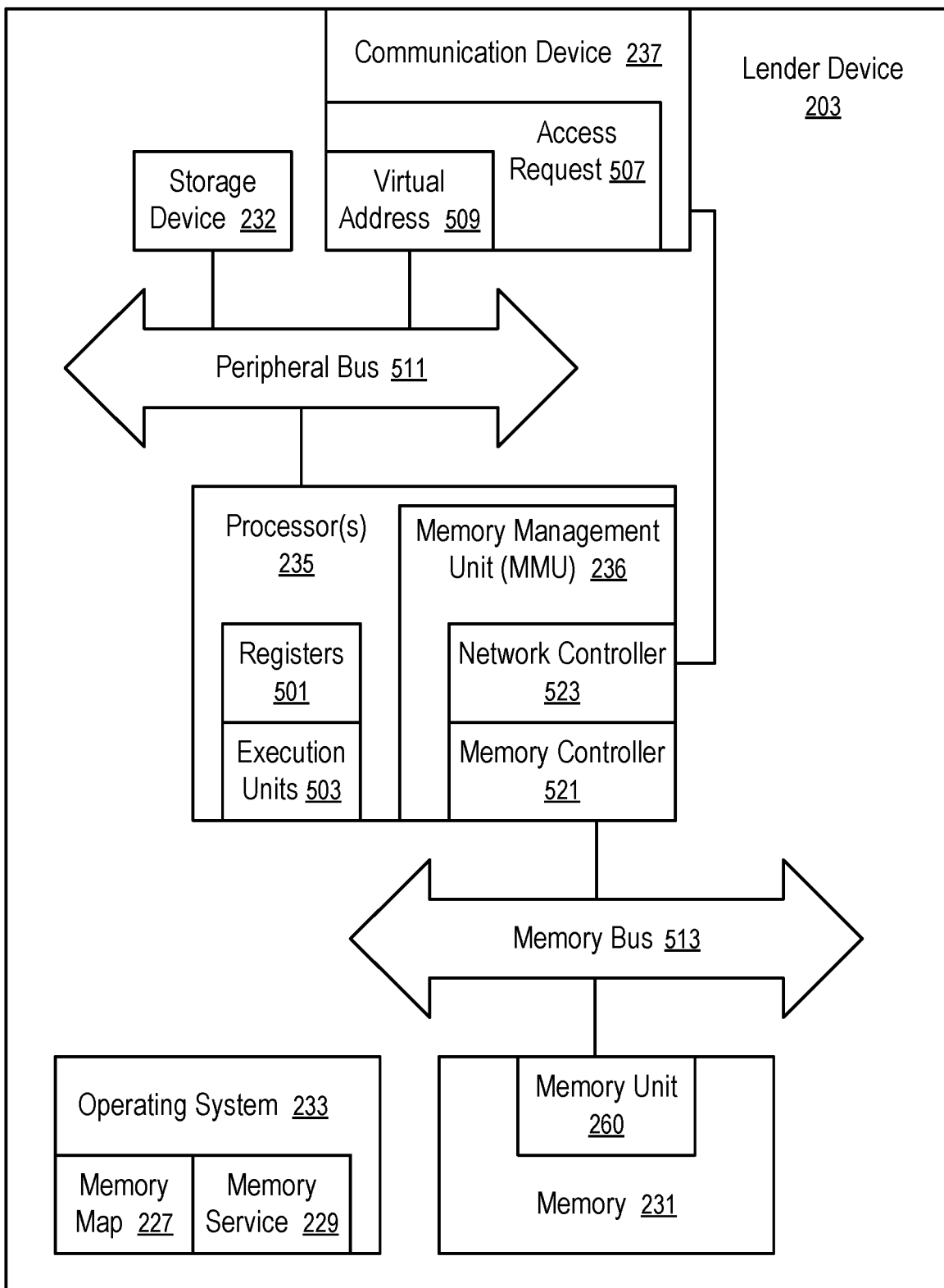

FIGS. 16 and 17 illustrate hardware accelerated configurations to provide access to loaned memory according to some embodiments. For example, the configuration of the lender device (203) illustrated in FIG. 13, 14 or 15 can be replaced with the configuration of FIG. 16 or 17.

In FIG. 16, the lender device (203) has a peripheral bus (511) and a memory bus (513).

A communication device (237) and a storage device (232) of the lender device (203) are connected to the processor(s) (235) of the lender device (203) via the peripheral bus (511). Local random access memory (231) of the lender device (203) is connected to the processor(s) via the memory bus (513).

The operating system (233) can be initially stored in the storage device (232) and subsequently loaded into the random access memory (231) for execution.

When the communication device (237) receives a memory access request (507) that identifies a virtual memory address (509) allocated by the operating system (233) for the borrowed memory (204) used by the borrower device (201), the communication device (237) is configured to request the processor (235) to process according to the memory access request (509).

At the time of the communication device (237) receiving the access request (507), the operating system (233) running in the lender device (203) may host the virtual address (509) in the storage device (232) or in the random access memory (231) (e.g., via the configuration of the memory map (227)).

If the virtual address (509) is hosted in the memory (231) and the memory management unit (MMU) (236) has a cached portion of the memory map (227) to translate the virtual address (509), the processor(s) (235) can process the access request (507) by accessing a physical address of the memory page (260) determined from the cached portion of the memory map (227).

If the virtual address (509) is hosted in the memory (231) and the memory management unit (MMU) (236) does not have a cached portion of the memory map (227) to translate the virtual address (509), the processor(s) (235) can execute the operating system (233) to update the cached portion of the memory map (227) such that the memory management unit (MMU) (236) can translate the virtual address (509) into the physical address of the memory page (260).

If the virtual address (509) is hosted in the storage device (232), such as a hard drive or a solid state drive, the memory management unit (MMU) (236) does not have a cached portion of the memory map (227) to translate the virtual address (509) (e.g., by generating a page fault). In response, the memory management unit (MMU) (236) causes the processor(s) (235) to execute the operating system (233), which can be configured to implement the access request (507) through accessing the storage device (232) and/or migrate a virtual memory region (e.g., a virtual memory page) into the random access memory (231).

If the virtual address (509) is hosted in another lender device (e.g., 245), the lender device (203) translates the virtual address (509) into a physical address that identifies a network address of its lender device (e.g., 245) and a virtual address assigned by its lender device (e.g., 245) (which can be optionally configured to be the same as the virtual address (509) in a unified address space). Then, the lender device (203) can access its lender device (e.g., 245) in a way similar to the borrower device (201) accessing the lender device (203).

The access request (507) can be configured in a form corresponding to the memory access requested during the instruction execution in the processor(s) (215) of the borrower device (201). For example, when a processor (215) of the borrower device (201) requests the loading of the instruction from a virtual address (255), the access request (507) is configured to request the retrieval of an instruction from the virtual address (509) (which can be optionally configured to be the same as the virtual address (255) in a unified address space).

For example, when a processor (215) of the borrower device (201) requests the loading of an operand from a virtual address (255), the access request (507) is configured to request the retrieval of the operand from the virtual address (509); and when a processor (215) of the borrower device (201) requests the storing of a computation result at a virtual address (255), the access request (507) is configured to request the retrieval of the operand from the virtual address (509).

Optionally, the access request (507) can be configured to implement migration of virtual address regions. For example, when the virtual address (509) is accessed, the communication device (237) is configured to automatically facilitate the migration of a virtual memory region between the lender device (203) and the borrower device (201).

Optionally, the communication device (237) is implemented as part of the memory management unit (MMU) (236) of the lender device (203).

Optionally, the memory management unit (MMU) (236) is configured to include a network controller (523) to operate the communication device (237), as illustrated in FIG. 17.

In FIG. 17, the memory management unit (MMU) (236) has a memory controller (521) configured to access the memory page (260) using a physical address for the memory (231). Further, the memory management unit (MMU) (236) has a network controller (521) configured to process network based memory access requests (e.g., 507). Such a network based memory access request (507) can be a request from its borrower device (e.g., 201), or its lender device (e.g., 245).

Figure 18:
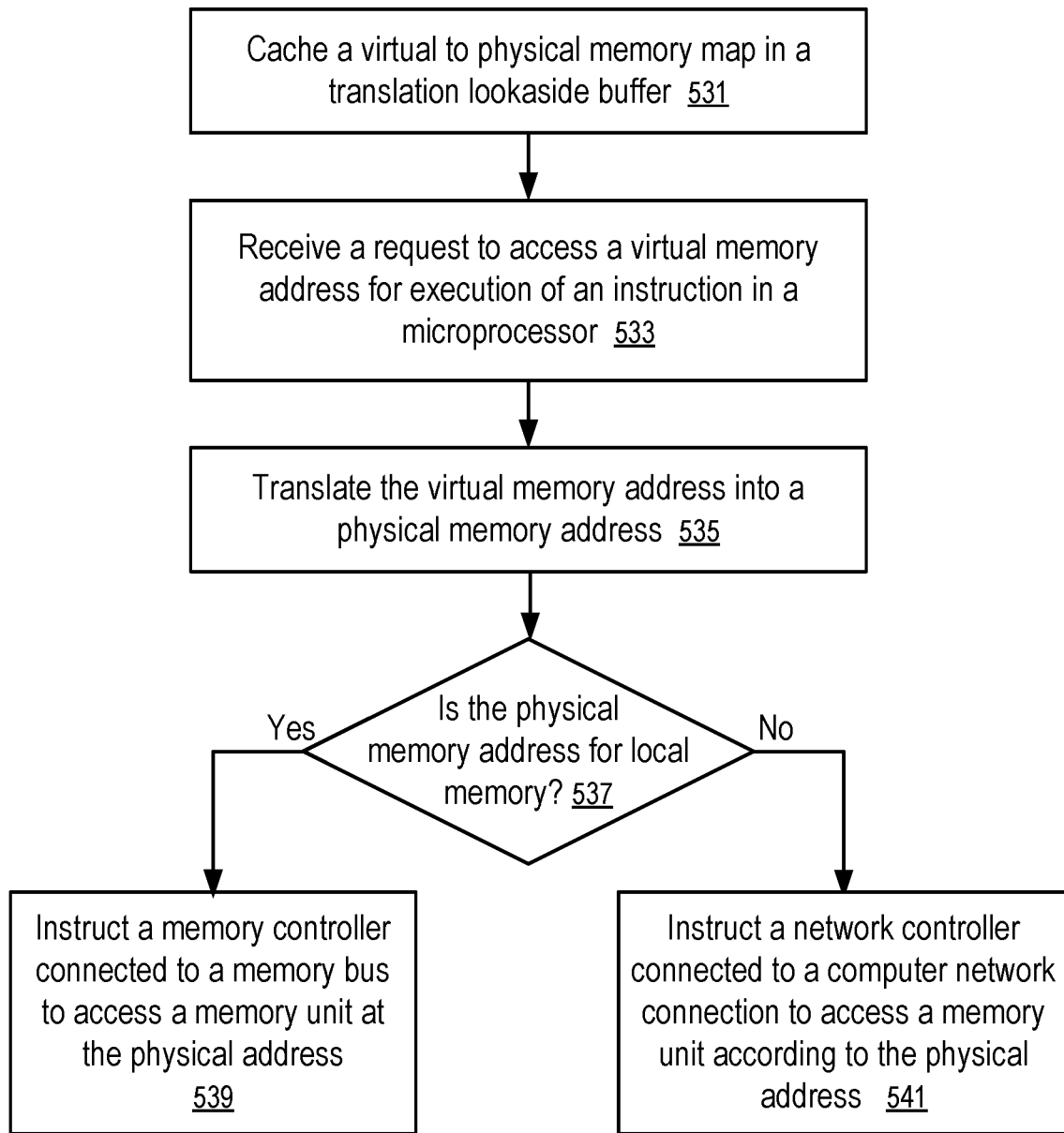
FIG. 18 shows a method to accelerate access to borrowed memory via a memory management unit according to one embodiment.

FIG. 18 shows a method to accelerate access to borrowed memory via a memory management unit according to one embodiment. For example, the method of FIG. 18 can be implemented in a device A (101) or device B (103), or a server P (105) illustrated in FIG. 1. For example, the method of FIG. 18 can be implemented in a borrower device (201) illustrated in FIG. 2, 6, 9, 13, 14 or 15. For example, the method of FIG. 18 can be implemented in a memory management unit (216) or a memory management unit (236) illustrated in FIG. 2, 3, or 13 to 17.

At block 531 in FIG. 18, a memory management unit (e.g., 216 or 236) caches a virtual to physical memory map (e.g., 253) in a translation lookaside buffer (e.g., 253) of the memory management unit (e.g., 216 or 236).

For example, the virtual to physical memory map (e.g., 253) can be a portion of page tables managed by the operating system (e.g., 213 or 233) of the computing device (e.g., 201 or 203) in which the memory management unit (e.g., 216 or 236) is configured.

At block 533, the memory management unit (e.g., 216 or 236) receives a request to access a virtual memory address (e.g., 255 or 509) for the execution of an instruction in a microprocessor (e.g., 215 or 235).

For example, the virtual memory address (255) can be stored in the registers (501) for the execution of the instruction in the processor (215). The virtual memory address (255) can be used to load the instruction from virtual memory address (255), to load an operand of the instruction from the virtual memory address (255), or to store a computing result generated by the execution units (503) after the execution of the instruction.

In some instances, the virtual memory address (509) is received in a communication device (237) in a memory access request from a network connection to a borrower device (e.g., 201); and the communication device (237) is configured to request the memory management unit (236) to process the access request (507).

At block 535, the memory management unit (e.g., 216 or 236) translates the virtual memory address (e.g., 255) into a physical memory address (e.g., 257) using the virtual to physical memory map (e.g., 253) cached in the translation lookaside buffer (e.g., 253).

At block 537, it is determined whether or not the physical memory address (e.g., 257) is for local memory (e.g., 211 or 231).

For example, the memory management unit (e.g., 216 or 236) can have connections to both a memory bus (e.g., 511) via a memory controller (e.g., 521) and a computer network (e.g., 109) via a network controller (523).

At block 539, if the physical memory address (e.g., 257) is determined (537) to be for the local memory (e.g., 211 or 231) (e.g., of a first memory type), the memory management unit (e.g., 216 or 236) instructs a memory controller (521) connected to a memory bus (513) to access a memory page (259) at the physical address (257).

At block 541, if the physical memory address (e.g., 257) is determined (537) not to be for the local memory (e.g., 211 or 231) (e.g., of a second memory type), the memory management unit (e.g., 216 or 236) instructs a network controller (523) connected to a computer network connection (205) to access a memory page (260) according to the physical address (257).

A memory management unit (MMU) (216 or 236) configured to perform the method of FIG. 18 can be used in a microprocessor (215 or 235) of a borrower device (201) or a lender device (203) that borrows memory for another device (e.g., 245).

A communication device (e.g., 201 or 203) having such a memory management unit (MMU) (216 or 236) can have a memory bus coupled to local random access memory (e.g., 211 or 213), and at least one microprocessor (e.g., 215 or 235). The microprocessor (e.g., 215) can further have registers (e.g., 501), and execution units (e.g., 503).

The computing device (e.g., 201 or 203) has an operating system (e.g., 213 or 233), including instructions, which when executed by the at least one microprocessor (e.g., 215 or 235), cause the computing device to borrow an amount of memory from a lender device (e.g., 203 or 245) over a network connection (205) using a communication device (e.g., 217 or 237).

The execution units (503) are configured to execute instructions using at least virtual memory addresses mapped to the amount of memory borrowed from the lender device (e.g., 203 or 245).

For example, after retrieving a first virtual memory address (255) from the registers (501) for the execution of an instruction in the execution units (503), the memory management unit (MMU) (216) translates the first virtual memory address (255) into a first physical address (257) that identifies the lender device (e.g., 203 or 245) over the network connection (205) and a second virtual memory address (509). The memory management unit (MMU) (216) instructs the communication device (217) to access, using the second virtual memory address, the memory (260) loaned by the lender device (203) to the computing device (201) over the network connection (205).

For example, the first physical address (257) can include a computer network address of the lender device (203).

The execution of the instruction in the execution units (503) can generate a memory operation to read or write at the first virtual memory address (255); and the memory management unit (253) is configured to generate a request (507) for the memory operation at the second virtual memory address (509) and instruct the communication device (217) to transmit the request (507) to the lender device (203) over the communication connection (205).

Operationally, the second virtual memory address (509) can be equal to the first virtual memory address (255) such that the lender device (203) and the borrower device (201) can use a unified virtual address space. For example, the operating system can be configured to receive the identification of the amount of borrowed memory (204) based on virtual memory addresses specified by the lender device (203) in the unified virtual address space; and the operating system can be configured to allocate virtual memory to applications directly from the virtual memory addresses in the unified virtual address space.

Optionally, the memory management unit (217) includes a buffer (505); and the memory management unit (216) is further configured to instruct the communication device (217) to communicate with the lender device (203) to establish a cache, in the buffer (505), for a portion of the amount of the memory (202) loaned by the lender device (203) to the borrower device (201), in response to the first virtual memory address (255) being received from the registers (501). For example, the communication device (217) can cache a page of memory according to a page table when the virtual address (255) in the page table is used.

Optionally, the memory management unit (217) is further configured to dynamically change from memory mappings between virtual memory and physical memory. For example, virtual memory identified by a set of virtual memory addresses can be initially mapped (e.g., in the translation lookaside buffer (TLB) (251)) to the memory (202) loaned by the lender device (203) to the borrower device; and the mapping can be changed to re-map the virtual memory to a portion of the local random access memory (211).

For example, the memory management unit (217) can swap the mapping of two virtual memory regions identified in the virtual to physical memory map (253) cached in the translation lookaside buffer (TLB) (251) such that a first virtual memory region initially mapped onto a region in the local memory (211) is re-mapped to a region in the loaned memory (202) in the lender device (203), and the second virtual memory region initially mapped onto the region (or another region) in the loaned memory (202) in the lender device (203) is re-mapped to the region (or another region) in the local memory (211).

For example, the memory management unit (217) can be further configured to identify the first virtual memory region and the second memory region for swapping based on a memory usage history in a past period of time or a predicted memory usage in a subsequent period of time. For example, a least recently used and/or least frequently used virtual memory page can be swapped from the local memory (211) to the loaned memory (202); and a most recently used and/or most frequently used virtual memory page can be swapped to the local memory (211) from the loaned memory (202).

In general, each of the devices or servers discussed above (e.g., 101, 103, 105, 107, 201, 203) can be implemented as one or more data processing systems.

A typical data processing system may include an inter-connect (e.g., bus and system core logic), which inter-connects a microprocessor(s) and memory. The microprocessor may also have on-die cache hierarchy.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), FLASH memory, 3D cross point or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions can result from execution of the code/instructions by a processor, such as a microprocessor or any IP block of SoS (System-on-a-Chip).

Alternatively, or in combination, the functions and operations as described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computing device, comprising:
   a communication device;
   random access memory; and
   at least one microprocessor having a memory management unit, registers, and execution units, the memory management unit coupled to the random access memory and the communication device;
   wherein the computing device is configured to access an amount of memory at a remote device over a network connection through the communication device;
   wherein the execution units are configured to execute instructions using at least virtual memory addresses mapped to the amount of memory at the remote device; and
   wherein the memory management unit is configured to:
      retrieve a first virtual memory address from the registers for execution of an instruction in the execution units;
      translate the first virtual memory address into a first physical address, the first physical address identifying the remote device over the network connection and a second virtual memory address;
      generate, according to the first physical address identifying the remote device, a memory access request identifying a memory page over the network connection; and
      instruct the communication device to transmit the memory access request over the network connection to access the memory page at the remote device over the network connection using the second virtual memory address.

2. The computing device of claim 1, wherein the first physical address includes a computer network address of the remote device.

3. The computing device of claim 2, wherein the execution of the instruction in the execution units causes a memory operation to read or write at the virtual memory address; and the memory management unit is configured to generate a request for the memory operation at the second virtual memory address and instruct the communication device to transmit the request to the remote device over the communication connection.

4. The computing device of claim 3, wherein the second virtual memory address is equal to the first virtual memory address.

5. The computing device of claim 3, wherein the computing device is configured to receive an identification of the amount of memory based on virtual memory addresses specified by the remote device; and the second virtual memory address is allocated from the virtual memory addresses specified by the remote device.

6. The computing device of claim 1, wherein the memory management unit includes a buffer; and the memory management unit is further configured to instruct the communication device to communicate with the remote device to establish a cache, in the buffer, for a portion of the amount of the memory at the remote device in response to the first virtual memory address being received from the registers.

7. The computing device of claim 1, wherein the memory management unit is further configured to change from mapping a set of virtual memory addresses to the amount of the memory at the remote device to mapping the set of virtual memory addresses to the random access memory.

8. A microprocessor, comprising:
registers;
execution units; and
a memory management unit having:
  a translation lookaside buffer configured to store a virtual to physical memory map;
  a memory controller configured to access random access memory over a memory bus; and
  a network controller configured to control a communication device connected to a wired or wireless network;
wherein the registers are configured to store a virtual memory address that is used in execution of an instruction in the execution units;
wherein the memory management unit is configured to translate the virtual memory address into a physical memory address according to the virtual to physical memory map in the translation lookaside buffer;
wherein the memory controller is configured to access a first memory page in the random access memory using the physical memory address, when the physical memory address is of a first type;
wherein the network controller is configured to access a second memory page over a network connection through the communication device, when the physical memory address is of a second type; and
wherein the memory management unit is configured to generate, according to the physical memory address of the second type, a memory access request identifying the second memory page over the network connection and instruct the network controller to transmit the memory access request over the network connection.

9. The microprocessor of claim 8, wherein the memory access request is configured to identify second memory page using the virtual memory address.

10. The microprocessor of claim 8, wherein the physical memory address of the second type identifies a computer network address of a computing device.

11. The microprocessor of claim 10, wherein the execution of the instruction in the execution units includes loading the instruction from the virtual memory address, loading an operand of the instruction from the virtual memory address, or storing a computing result of the instruction to the virtual memory address.

12. The microprocessor of claim 10, wherein the memory management unit includes a buffer; and the memory management unit is further configured to instruct the network controller to communicate with the computing device over the network connection to cache a region of memory, including the second memory page, in the buffer.

13. The microprocessor of claim 10, wherein the memory management unit is further configured to instruct the memory controller and the network controller to perform a swap of first content in a first memory region having the first memory page with second content in a second memory region having the second memory page, and update the virtual to physical memory map based on the swap.

14. A memory management unit, comprising:
a translation lookaside buffer configured to cache a virtual to physical memory map;
a memory controller configured to access random access memory connected via a memory bus to the memory controller; and
a communication device configured to communicate with a computing device over a wired or wireless network using a network connection;
wherein the memory management unit is configured to translate a virtual memory address into a physical memory address according to the virtual to physical memory map in the translation lookaside buffer;
wherein the memory controller is configured to access a first memory page in the random access memory using the physical memory address when the physical memory address is for the random access memory;
wherein the communication device is configured to access a second memory page over the network connection when the physical memory address is for memory of the computing device; and
wherein the memory management unit is further configured to change:
  from mapping a first virtual memory region to a physical memory region accessible via the memory controller and mapping a second virtual memory region to a physical memory region accessible via the communication device,
  to mapping the second virtual memory region to the physical memory region accessible via the memory controller and mapping the first virtual memory region to a physical memory region accessible via the communication device.

15. The memory management unit of claim 14, wherein the memory management unit is further configured to identify the first virtual memory region and the second virtual memory region based on a memory usage history in a past period of time or a predicted memory usage in a subsequent period of time.

16. The memory management unit of claim 14, wherein the communication device is configured to communicate with the computing device at least over a fifth generation cellular network.

17. The memory management unit of claim 14, wherein the communication device is configured to load an instruction from the second memory page, load an operand of the instruction from the second memory page, or store a computing result of the instruction in the second memory page, according to the virtual memory address.

18. The memory management unit of claim 17, wherein the memory management unit is configured to generate, according to the physical memory address for the memory of the computing device, a memory access request; and the memory access request is configured to identify the second memory page using a memory address in a unified address space and request the computing device to provide the instruction from the second memory page, provide the operand of the instruction from the second memory page, or store the computing result of the instruction in the second memory page.

19. The memory management unit of claim 18, wherein the memory address in the unified address space is same as the virtual memory address.

* * * * *